US007062781B2

(12) United States Patent
Shambroom

(10) Patent No.: US 7,062,781 B2
(45) Date of Patent: Jun. 13, 2006

(54) METHOD FOR PROVIDING SIMULTANEOUS PARALLEL SECURE COMMAND EXECUTION ON MULTIPLE REMOTE HOSTS

(75) Inventor: W. David Shambroom, Arlington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 885 days.

(21) Appl. No.: 09/741,103

(22) Filed: Dec. 21, 2000

(65) Prior Publication Data

US 2001/0034841 A1    Oct. 25, 2001

Related U.S. Application Data

(63) Continuation-in-part of application No. 09/309,695, filed on May 11, 1999, now Pat. No. 6,198,824, which is a continuation of application No. 08/799,402, filed on Feb. 12, 1997, now Pat. No. 5,923,756.

(51) Int. Cl.
*H04L 9/32* (2006.01)
*H04L 12/22* (2006.01)

(52) U.S. Cl. .................. 726/10; 726/4; 726/8; 726/29; 713/156; 713/168; 713/170; 709/203; 709/213; 709/219; 709/243; 705/76; 380/277

(58) Field of Classification Search ............... 709/219, 709/330; 713/153–168
See application file for complete search history.

(56) References Cited

U.S. PATENT DOCUMENTS

| 4,672,572 | A | * | 6/1987 | Alsberg | ...................... 713/202 |
|---|---|---|---|---|---|
| 5,241,594 | A | * | 8/1993 | Kung | ......................... 713/151 |
| 5,313,521 | A | | 5/1994 | Torii et al. | ..................... 380/25 |
| 5,349,643 | A | | 9/1994 | Cox et al. | ...................... 380/25 |
| 5,416,842 | A | | 5/1995 | Aziz | ........................... 380/25 |
| 5,511,122 | A | | 4/1996 | Atkinson | ...................... 380/23 |
| 5,590,199 | A | | 12/1996 | Krajewski, Jr. et al. | ...... 380/25 |
| 5,604,803 | A | | 2/1997 | Aziz | ........................... 380/25 |
| 5,764,687 | A | | 6/1998 | Easton | ......................... 380/23 |
| 5,768,504 | A | | 6/1998 | Kells et al. | .................... 380/25 |
| 5,774,551 | A | * | 6/1998 | Wu et al. | .................... 713/155 |
| 5,815,574 | A | * | 9/1998 | Fortinsky | .................... 713/153 |
| 6,606,708 | B1 | * | 8/2003 | Devine et al. | ................. 726/8 |
| 6,657,956 | B1 | * | 12/2003 | Sigaud | ........................ 370/230 |

OTHER PUBLICATIONS

Microsoft, "Microsoft Windows NT™ Server Version 4.0, A guide to Reviewing and Evaluating", Microsoft Corp., Aug. 1996, entire document.*

(Continued)

*Primary Examiner*—Christopher Revak
*Assistant Examiner*—Ronald Baum
(74) *Attorney, Agent, or Firm*—Leonard C. Suchtya, Esq.; Joel Wall, Esq.

(57) ABSTRACT

A system provides secure communication of commands from a client (600) to multiple hosts (1200) via a network server (700). The system receives at least one command from the client (600), initiates one or more remote execution processes (1040) for processing the at least one command, and transmits the at least one command to one or more of the hosts (1200) via the one or more remote execution processes (1040). The system obtains, from the one or more remote execution processes (1040), data associated with the one or more hosts (1200) executing the at least one command, formats the data, and sends the formatted data to the client (600).

37 Claims, 16 Drawing Sheets

OTHER PUBLICATIONS

Yin, J., Automating the Remote Execution of Server Administrator CLI Commands, PowerSolutions, May 2002, pp. 50-54, entire article, ftp.jp.dell.com/app/2q02-Yin.pdf.*

Lawrence, R., "A survey of Process Migration Mechanisms", Dept. of CS, Univ. of Manitoba, May 29, 1998, entire article, www.cs.uiowa.edu/~rlawrenc/research/Papers/proc_mig.pdf.*

Freier, Alan O., et al., The SSL Protocol, Version 3.0, Mar. 4, 1996.

Kohl, J. and Neuman, C., The *Kerberos* Network Authentication Service (V5), Sep. 1993.

Schneier, Bruce, Applied Cryptography, 2nd ed. (1996), pp. 566-572.

Steiner, Jennifer G., et al., "*Kerberos*: An Authentication Service for Open Network Systems," Mar. 30, 1988.

Kohl, John T., et al., "The Evoluation of the *Kerberos* Authentication Service," Spring 1991 EurOpen Conference, Tromso, Norway.

Gradient Technologies, Inc., Web Integration Strategies: Believe It Or Not-Gradient Technologies' WebCrusader, Apr. 1996, pp. 1-12.

Gradient Technologies, Inc., Developing Secure Web-based Java Applications, The Integration of Web Crusader and Net Dynamics, May 1997, pp. 1-16.

Gradient Technologies, Inc., Encryption Security In the Enterprise, Public Key/Secret Key, Jan. 1997, pp. 1-20.

InformationWeek, Spinning A Secure Web, Aug. 12, 1996 (4 pages).

Gradient Technologies, Inc., NetCrusader Product Data Sheet, NetCrusader's Distributed Services Product Line, Mar. 1997 (4 pages).

Gradient Technologies, Inc., NetCrusader Product Family Overview, Mar. 1997 (4 pages).

Gradient Technologies, Inc., NetCrusader Product Data Sheet, NetCrusader Commander, Mar. 1997 (4 pages).

Gradient Technologies, Inc., WebCrusader Product Data Sheet, WebCrusader Product Line, Mar. 1997 (4 pages).

Gradient Technologies, Inc., Web-based Applications Make the Grade at Penn State University, 1996 (2 pages).

MIT, Kerberos V5 Installation Guide (Release beta 7), Sep. 11, 1996.

MIT, Kerberos V5 System Administrator's Guide (Release beta 7), Sep. 10, 1996.

MIT, Kerberos V5 UNIX User's Guide (Release beta 7), Sep. 10, 1996.

MIT, Kerberos V5 Application Programming Library, Sep. 10, 1996.

MIT, Kerberos V5 Data Encryption Standard Library draft, p. 1.

MIT, Kerberos V5 Implementer's Guide, Sep. 10, 1996.

Jaspan, Barry, Kerberos Administration System KADMS API Functional Specifications, Sep. 10, 1996.

Jaspan, Barry, KADMS Library and Server Implementation Design, Sep. 10, 1996.

Kamens, Jonathan I., KADMS Admin API Unit Test Description, Sep. 10, 1996.

Kamens, Jonathan I., Open V*Secure Admin Database API Unit Test Description*, Sep. 10, 1996.

MIT, Kerberos V5 Installation Guide (Release 1.0) Dec. 18, 1996.

MIT, Kerberos V5 System Administrator's Guide (Release 1.0), Nov. 27, 1996.

MIT, Kerberos V5 UNIX User's Guide (Release 1.0), Dec. 18, 1996.

MIT, Upgrading to Kerberos V5 from Kerberos V4 (Release 1.0), Dec. 18, 1996.

* cited by examiner

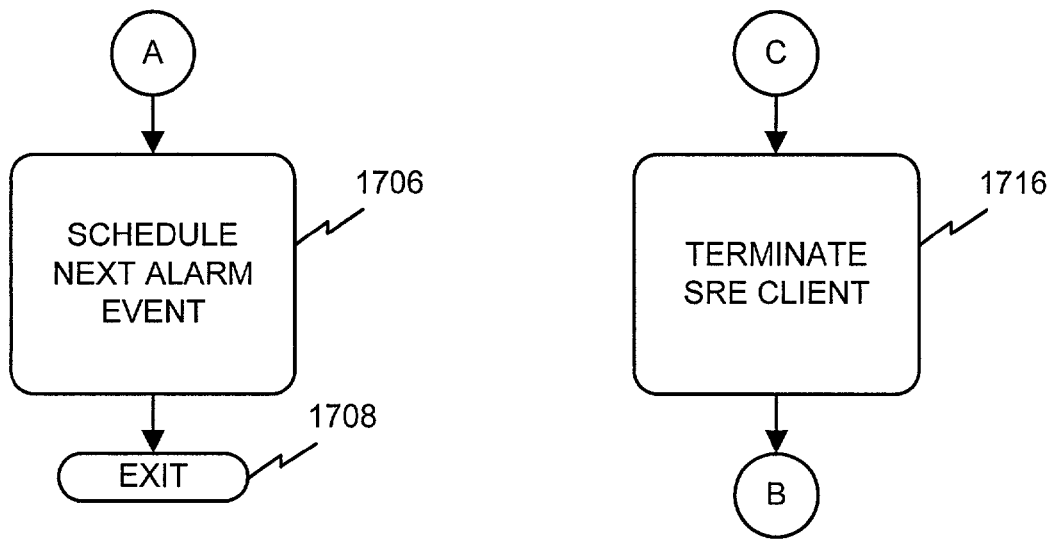
FIGURE 9B          FIGURE 9C
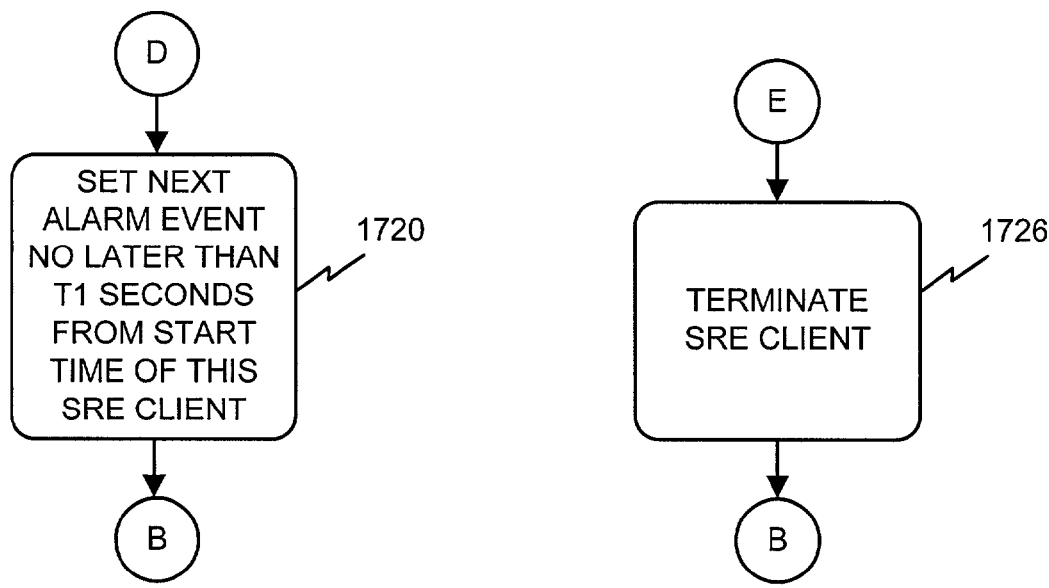
FIGURE 9D          FIGURE 9E

METHOD FOR PROVIDING SIMULTANEOUS PARALLEL SECURE COMMAND EXECUTION ON MULTIPLE REMOTE HOSTS

RELATED APPLICATIONS

This patent application is a continuation-in-part of application, Ser. No. 09/309,695, filed May 11, 1999, now U.S. Pat. No. 6,198,824 and which is a continuation of application, Ser. No. 08/799,402, filed Feb. 12, 1997, now U.S. Pat. No. 5,923,756, all of which were invented by the inventor named herein and are hereby incorporated by reference.

BACKGROUND OF THE INVENTION

The present invention relates generally to improving the security of data transmission between computers using a non-secure network and, more particularly, to methods and systems for improving the integrity and security of messages transmitted between a client and one or more destination servers via a network server as part of a distributed computer system.

A distributed computer system contains multiple distinct and interconnected computers. One simple example of a general-purpose distributed system is a networked system containing several workstations and servers interconnected through a network. Networks are popular because they allow organizations to share information and resources. Furthermore, in a networked system, if one computer breaks, or "crashes," the others may continue to operate.

The type, cost and reliability of the manner of interconnection can be important considerations in networked systems. Large networks over relatively short distances typically use local area networks (LAN), such as an Ethernet or a Token Ring, that permit communications between a number of different computers on one or more wires. The use of modems allows computer networks to be created over a larger area, because the connections can be made over data links, such as telephone lines. Wide area networks (WAN) typically use a combination of fiber optic and copper wire telephone lines as well as microwave links and satellites to connect several smaller LANs. Networks within networks are often referred to as internetworks.

Computer networks, particularly internetworks, can be vulnerable to security breaches. The degree of security of each component in the network differs, in part because each entity may be protected by varying layers of physical and operational security. Furthermore, each component or network in an internetwork may be owned or controlled by different organizations whose security practices differ widely. The interconnections between the computers may be similarly non-secure. Since some part of the network may use physically non-secure links, such as telephone lines or microwave links, hackers and interlopers may eavesdrop or intercept communications over the telephone lines and modify them according to their wishes or copy them for later use. Interlopers who copy login and/or command information have the potential to use that information to gain access to other computers on the network.

Network security is typically based on at least three general concepts. For every request to do an operation, such as execute a diagnostic routine or perform a remote login, the network 1) authenticates the request; 2) controls access via access control criteria; and 3) audits every request to detect unauthorized uses.

Authentication is the process of verifying the identity of a user initiating a request. One common example of authentication is the use of a password at the time of login. Upon receiving a username and password from a user, a host computer retrieves the password associated with the username in a password file, and if the supplied password matches the password associated with that username, the host computer allows access. In the situation just described, however, it is assumed that the user and host are communicating over a secure connection; otherwise, interlopers could intercept the communications from the user to the host and steal the username and password information. The interloper could then illegally access the host at a later time by using the stolen username and password information.

In a networked system with multiple interconnected computers, a first computer may request service from a second or destination server through an intermediate server. This first computer is typically called a client. In order to receive service from a destination server, the client must begin by authenticating itself to the destination server. Because the client may be communicating with the destination server over a non-secure line, however, the client cannot simply send a password in the clear. Instead, the client and the destination server may engage in a multiple query and response exchange, constituting an authentication process, which will convince the destination server that the requesting client is an authorized user.

The prior art includes examples of encryption-based authentication processes that can be used to authenticate a client to such a server. Such authentication processes can be based on public-key or secret-key encryption systems. In a typical secret-key authentication scheme, each authorized party possesses a secret key that is known only by the party and is registered with a trusted third party or authentication server. The authentication server maintains a list of registered parties and secret keys and, therefore, must be physically secure. By contrast, in a public-key authentication system, each party has a public key and a private key. The public key is posted; the private key is known only to the party.

One example of a secret-key based network authentication system is the trusted third-party authentication service called Kerberos. Network services and clients (principals) requiring authentication register with a Kerberos security server and receive a secret key, where the key (or a pass phrase from which it can be derived) is known only to the principal and the Kerberos security servers. Kerberos also generates temporary session keys that can be used to encrypt messages between two registered Kerberos principals (users or hosts). A typical Kerberos software package is Kerberos Version 5 from Project Athena at the Massachusetts Institute of Technology (MIT). The Kerberos authentication scheme also is discussed in J. Kohl and C. Neuman, The Network Authentication Service (V5), Request for Comments: 1510 (September 1993). Kerberos and other trusted third-party private authentication schemes can allow for secure access between two principals.

Other prior art systems have been developed to address network security issues. For example, the Secure Sockets Layer (SSL) has been designed specifically to protect the information being transmitted across the Internet by using encryption. Both the client and the destination server must support SSL. SSL is application independent and operates above the Transport layer, meaning that it can operate under application protocols, such as HTTP, File Transfer Protocol (FTP), telnet, Network News Transport Protocol (NNTP), and Simple Mail Transport Protocol (SMTP). SSL supports several cryptographic algorithms to support the authentication and encryption functions between the client and the server.

A current trend in distributed system development is the concept of managed hosts. In a managed host system, a client will access a network server and, via the network server, request access to one or more second servers, which may be referred to as the remote hosts, or the managed hosts. In larger networks, the network server may be acting as a gateway and proxy for a large number of clients to each access a large number of destination servers. In the case where a client requests that an operation be performed on a large number of destination servers, it is often a requirement that the total elapsed time for completion of these operations be significantly less than the time it would take to perform the operations on each destination server individually and sequentially. In order for the transaction from a client to a destination server to be secure, both the transactions between the client and the network server and the transactions between the network server and the destination server should be secured by a network authentication and encryption process.

In a certificate-based authentication scheme, all entities that wish to communicate with one another must register with a third party called a certificate authority. The certificate authority verifies the identity of the registering party and issues certificates that the parties can then use to authenticate themselves to other registered parties. There are many certificate authorities offering suitable certificates of authentication including, for example, those provided by Verisign, Baltimore Technologies, and RSA Laboratories.

There are a number of problems associated with simply using one type of authentication process to secure the transactions between the client and network server and the transactions between the network server and the destination server. Use of this system, for example, would require that the network server, all clients and all destination servers possess certificates ultimately traceable to the same top-level certification authority. Furthermore, each individual user of a client system must be issued a client certificate. If the client certificates were stored on the individual workstations, the client would be restricted to using only particular workstations. If the client certificates were stored on a portable media, such as diskettes, they would be subject to loss or theft, decreasing the security of the overall network system. Moreover, client workstations may be any one of a number of different hardware devices, such as personal computers (PCs) or Macintoshes, running a variety of different operating systems, such as UNIX or DOS, and there is no single medium supported by all the varieties of clients. In summary, use of a certificate authentication scheme between the client and the network server would be administratively difficult to support.

If Kerberos authentication for all transactions is used, each client workstation is required to possess the software necessary to communicate with the key distribution center. This approach encounters problems including that of providing many different versions of the software to support the many varieties of clients.

If one authentication scheme is used to secure transactions between the client and the network server, while another authentication scheme is used to secure transactions between the network server and the destination servers, then in transactions between the client and the destination server, the network server must act as a proxy for the client, and it may sometimes be undesirable to require the network server to perform client authentication. Since, by using two different authentication schemes, the client would not be authenticating itself to the destination server directly, the network server needs to act as if it has the identity and memory of the client server.

In server-to-server transactions, the user typically has directly logged on to the network server using a shell or command interpreter program. The shell program creates records on the network server that maintain a record of the user's identity, authentication credentials, and use (i.e., time and date). As long as the user is logged on, the shell or command interpreter program exists. In contrast, in a client-to-managed host transaction, the shell logon program is active on the client computer, but not on the server. The network server, instead, is interfacing with a key distribution center, or authentication server, on behalf of the client. To do this, a network server configured as a World Wide Web server creates and executes transient processes (such as when an HTTP Common Gateway Interface (CGI) request is executed) to query the key distribution center. These temporary processes must assume in some sense the identity of the user for the length of the transaction. Once their function is complete, however, these transient processes terminate and disappear, resulting in the loss of any identity or session state data they may have acquired.

When a network server does not maintain any information on a client once it has finished processing a request by the client, the server is described as stateless. A stateless file server avoids retaining client information by deriving information about files and positions within files from the request itself. A state-based server (e.g., one that stores file information in volatile memory) loses the information when the server crashes. In addition, if the client fails, the server may be unaware that the client is no longer using the space allocated to retain information needed for the transactions and may be unable to reclaim the space. In contrast, following the crash of a client or server, the stateless server need only respond to the last fully self-contained request from the client to continue the operation. In a UNIX operating environment, the UNIX processes (e.g., daemons) are sometimes state-based. Individual transient processes, however, are not persistent and, therefore, cannot maintain long-term state information internally.

There is a need, therefore, for a method of and system for increasing security of transactions involving multiple networked computers, and for increasing security of transactions involving one or more clients that send commands to one or more managed hosts via an intermediate server over a non-secure network, such as the Internet.

There is also a need for a method of and system for increasing security of transactions involving a client, a network server, and one or more managed hosts, where the client is not restricted to one of a limited subset of devices or operating systems because of interoperability or administration concerns.

Moreover, a need exists for a method of and system for increasing security of transactions involving a client, a network server, and one or more managed hosts, where the increased security is attained by using an SSL protocol for communications between the client and the network server, a Kerberos authentication system is used to authenticate the identity of the client to the managed host(s) and the managed host(s) to the client, and the client communicates with the managed host(s) through a non-secure network connection, such as the Internet.

Further, a need exists for a method of an system for allowing transactions from a network server, on behalf of one or more clients, to large numbers of managed hosts, to proceed simultaneously and in parallel.

Needs also exist to allow many varieties of clients to communicate with one or more destination servers via a network server over a non-secure network connection using authentication protocols and to allow transmission of data or commands over a non-secure computer network from a client to a destination server via a network server.

Another desire is for a system and method to allow necessary client information to pass to the network server with each transaction so that the network server may access the destination server(s) on behalf of the client.

Further features and advantages of the present invention will become apparent from the following drawings and detailed description of the preferred embodiments.

SUMMARY OF THE INVENTION

Systems and methods consistent with the present invention increase security of data transmissions between a client, a network server and one or more managed hosts using a nonsecure network, such as the Internet. After establishing a secure network connection between a client and a network server, a secure authentication protocol is used to obtain at the network server client-authenticating information from a key distribution center. The client-authenticating information is transmitted from the network server to the client and erased from the network server. The client-identifying information is transmitted back to the network server from the client along with a message for the destination server(s). Credentials are obtained to access the destination server(s) from the key distribution center over the non-secure network using the secure authentication protocol. At the destination server(s), the identity of the client accessing the destination server(s) is validated using the message. The destination server is accessed with the message if the client's authorization is properly validated.

Establishing the secure network connection between the client and the network server can use the Secure Sockets Layer (SSL) protocol. Obtaining client-authenticating information and securing the network connection between the network server and the destination server(s) can use the Kerberos authentication protocol. Access to the destination server(s) by authenticated users can be controlled by access control lists on the destination server(s).

Systems and methods consistent with the present invention facilitate the execution of commands on large numbers of remote computers simultaneously and in a secure manner. In accordance with the purpose of the invention as embodied and broadly described herein, a method provides secure communication of commands from a client to multiple hosts via a network server. The method includes receiving at least one command from the client, initiating one or more remote execution processes for processing the at least one command, and transmitting the at least one command to one or more of the hosts via the one or more remote execution processes. The method further includes obtaining, from the one or more remote execution processes, data associated with the one or more hosts executing the at least one command, formatting the data, and sending the formatted data to the client.

In another implementation consistent with the present invention, a computer-readable medium stores instructions executable by one or more processors for performing a method for secure communication of messages from a client to multiple hosts via a network server. The computer-readable medium includes instructions for acquiring at least one message from the client; instructions for initiating one or more remote execution processes for processing the at least one message; instructions for transmitting the at least one message to one or more of the hosts via the one or more remote execution processes; instructions for obtaining, from the one or more remote execution processes, data associated with the one or more hosts processing the at least one message; and instructions for transmitting the data to the client.

In a further implementation consistent with the present invention, a network server communicates with one or more clients and multiple hosts. The network server includes remote execution processes, a service interface, and a parallel execution utility. The service interface receives messages from the clients and transmits data associated with the messages to the clients. The parallel execution utility initiates one or more of the remote execution processes to process the messages from the clients, transmits the messages to one or more of the hosts via the one or more remote execution processes, obtains, from the one or more remote execution processes, data associated with the one or more hosts processing the messages, and provides the data to the service interface.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the invention.

FIGS. 9A–9E are flow charts of exemplary processing of an alarm event handler in accordance with an implementation consistent with the present invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

A. Exemplary System

A method and apparatus useful to implement the present invention will first be discussed in general with reference to FIGS. 1, 2, and 3.

Figure 1:
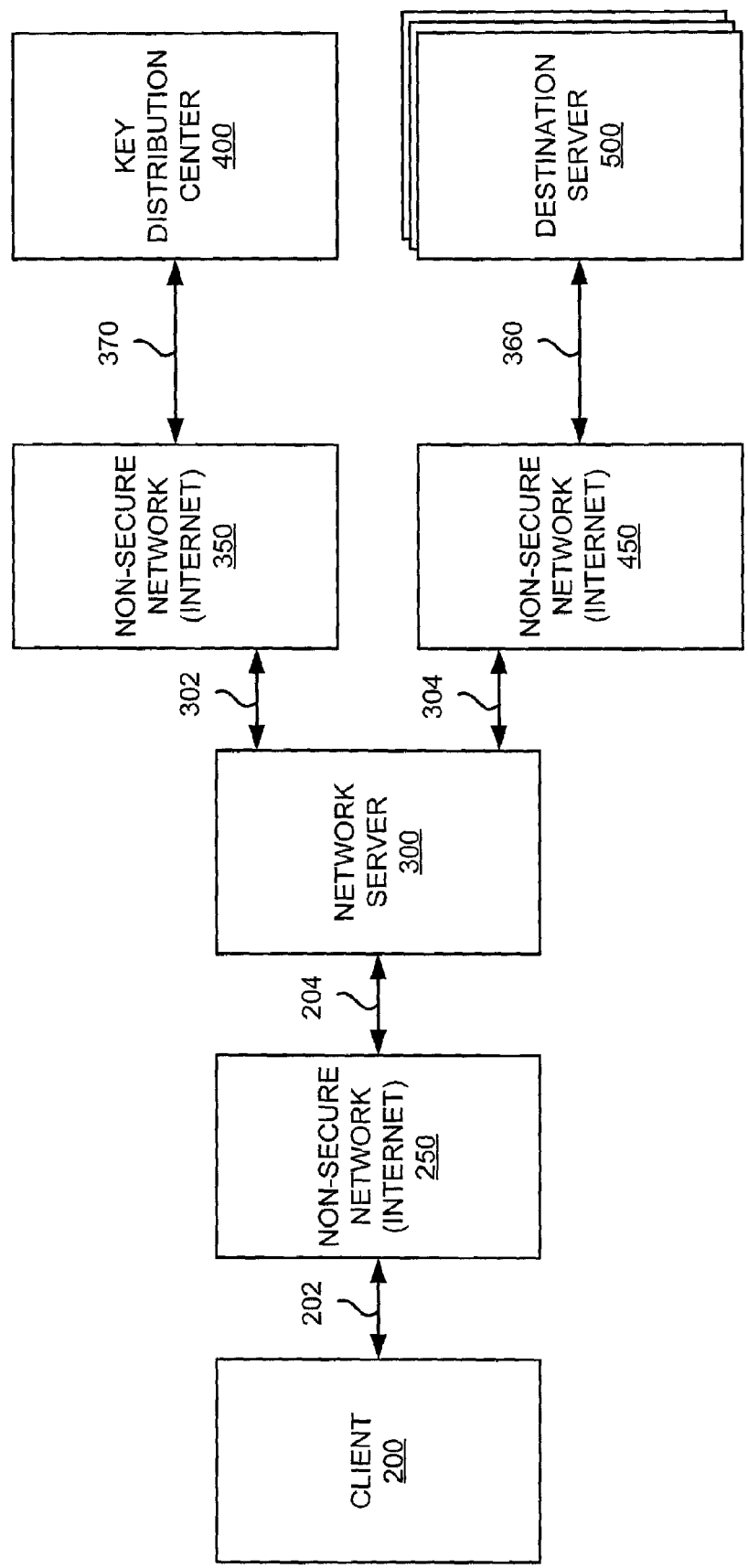
FIG. 1 is a block diagram of one system that may be used to implement the present invention.

As shown in FIG. 1, the present invention uses a client workstation (indicated generally as client 200), which can be, by way of example only, a personal computer (PC) running Microsoft Windows95, Windows98, Windows2000, or WindowsNT, a Macintosh or a UNIX workstation. Client 200 may connect to a non-secure network 250 (such as the Internet) via data link 202. A network server 300, which communicates with client 200 along non-secure network connection 250, can, by way of example only, be a UNIX server. Network server 300 may connect to non-secure network connection 250 via data link 204 as well as a second non-secure network connection 350 via suitable data link 302 and a third non-secure network connection 450 via suitable data link 304. One or more destination servers 500 communicate with network server 300, also through the non-secure network connection 450, via data link 360. Destination server 500 can be, by way of example only, a UNIX server. A key distribution center (KDC) 400, which validates requests to establish proper identity, is likewise in communication with network server 300 through data link 370 and non-secure network connection 350.

It is to be understood that FIG. 1 describes an exemplary network where each of the hardware components may be implemented by conventional, commercially available computer systems. Data links 202, 204, 302, 304, 360, and 370 can be any suitable communications medium, such as, for example, data links using modems. Also, by way of example only, each computer or server can operate using an operating system, such as UNIX.

Additionally, network server 300 and KDC 400 may contain information that can be used to compromise the security of the system. Therefore, physical access to network server 300 and KDC 400 should be adequately controlled.

1. Establishing a Secure Network Connection between a Client and a Network Server As used herein, it is to be understood that the term "secure," as applied to network server 300, destination server 500, and KDC 400, means that information stored in the servers is accessible under normal, expected operating conditions only by suitably authorized individuals.

In the embodiment of FIG. 1, client 200 and network server 300 communicate via non-secure network 250. Client 200 may connect to non-secure network 250 via data link 202 that, by way of example only, may be a TCP/IP network connection. Network server 300 may connect to non-secure network 250 via data link 204, which also may be a TCP/IP network connection. To enhance message privacy and integrity, client 200 and network server 300 preferably communicate using a secure authentication and/or encryption protocol to establish a secure network connection between client 200 and network server 300. Any suitably reliable, publicly available authentication protocol may be used, provided that such protocol is capable of successfully proving the identity of network server 300 to client 200 to, thereby, result in confidence on the part of client 200 that future communications are with network server 300 and not some impersonating entity.

The authentication protocol preferably also produces a session key that is known only to client 200 and network server 300 and can be used to encrypt subsequent transactions between client 200 and network server 300. One example of such an authentication protocol that has been developed specifically for use with TCP/IP Internet connections is the publicly available SSL protocol, Version 3.0, developed by Netscape Communications Corporation.

Figure 2:
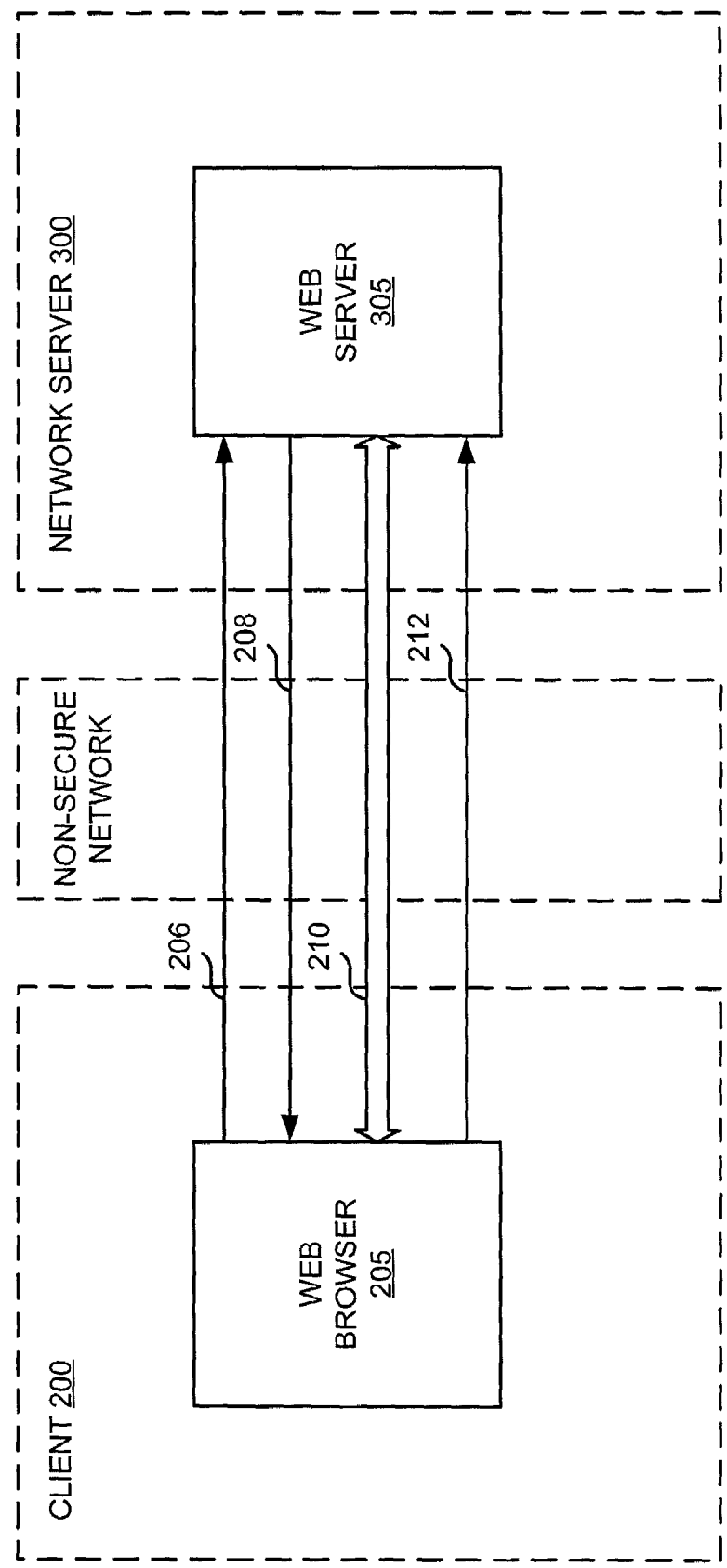
FIG. 2 is a more detailed block diagram of the client and network server of FIG. 1.
Figure 3:
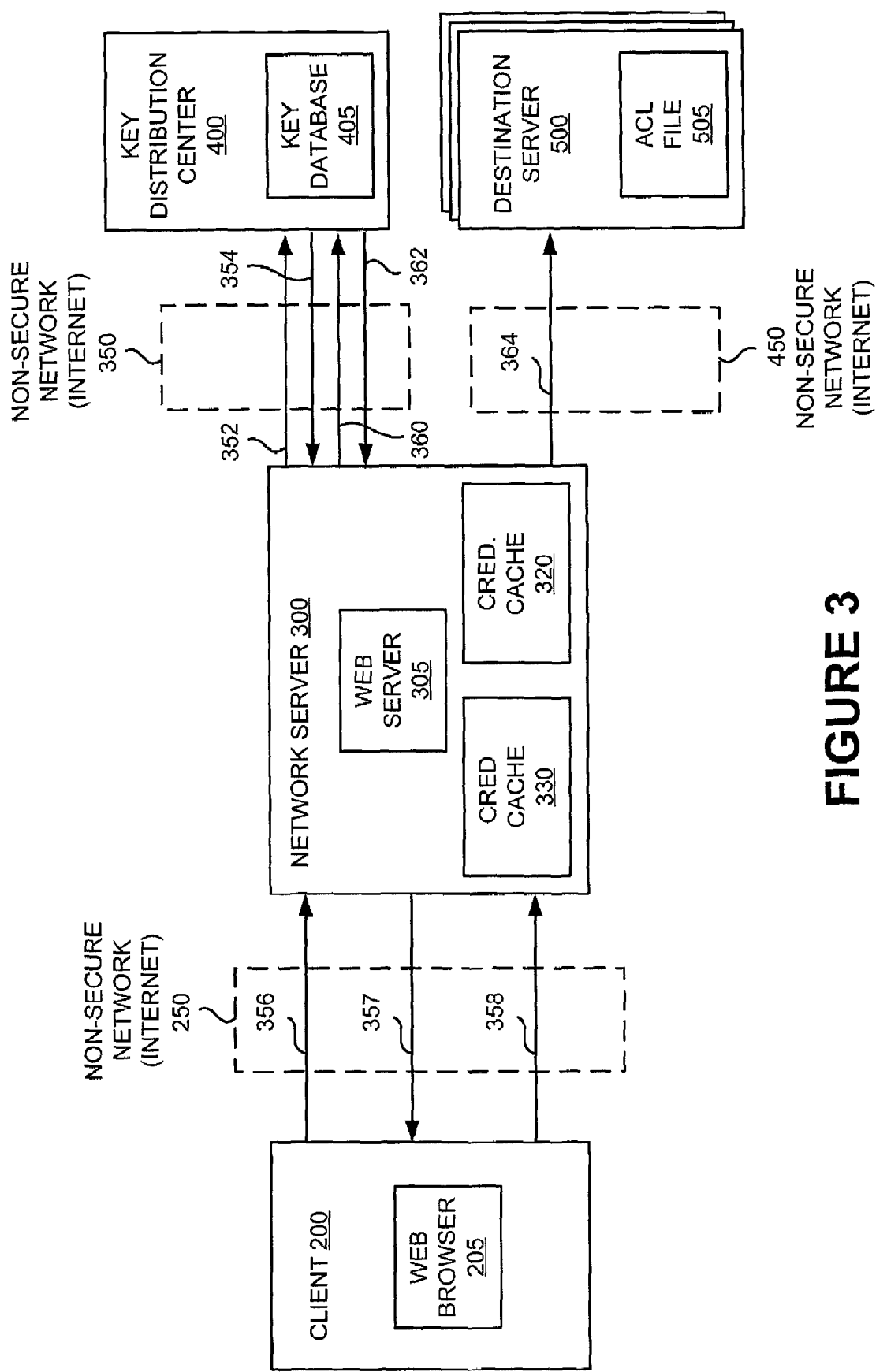
FIG. 3 is a more detailed block diagram of the client, network server, key distribution center, and destination server of FIG. 1.

FIG. 2 shows in more detail one embodiment of the manner in which communications can be carried out between client 200 and network server 300. As shown in FIG. 2, client 200, which can include a web browser 205, initiates a request for authenticated secure access to the web server 305 of network server 300 as indicated by arrow 206. Client 200 may be operating any publicly available web browser software package, such as, for example, Netscape Navigator. Because the request may be transmitted in the clear across a non-secure communications link, the request at 206 should not contain login or password information.

Web server 305 of network server 300 responds to the request at 206 by transmitting information back to web browser 205 that may be used to authenticate the identity of network server 300 to client 200 and support generation of additional information that may be used to encrypt future transmissions between client 200 and network server 300. If, for example, an SSL transaction is employed in the system of FIG. 2, web server 305 may send web browser 205, as indicated by arrow 208, a certificate that includes network server 300's public key and an identifier indicating a cryptographic algorithm supported by network server 300.

To properly establish the connection, network server 300 and client 200 perform a handshake process indicated at arrow 210 that, if successfully completed, provides both client 200 and network server 300 with a session key known only to network server 300 and client 200. This session key can be used to encrypt future transactions between network server 300 and client 200. In the handshake process of SSL, for example, client 200 creates a session key, encrypts the session key using one of the cryptographic algorithms indicated by network server 300 in the certificate and the public key sent by network server 300, and sends the encrypted session key to network server 300. After receiving the encrypted session key, network server 300 authenticates itself to client 200 by decrypting this session key and returning to client 200 a message encrypted with the underlying session key.

When the handshake indicated at arrow 210 successfully completes, client 200 and server 300 continue to use the session key to encrypt future transactions. As depicted generally in FIG. 1, the connection 202 and 204 between client 200 and server 300 are, therefore, protected to the degree of security achieved by the encryption algorithm.

Once an appropriately secure network connection is established between client 200 and network server 300, web server 305 sends a login form to client 200, and as indicated at 212, client 200, returns login data consisting of the name and password of a Kerberos principal to web server 305.

2. Authenticating a Client to a Key Distribution Center and Obtaining Client-Authenticating Information from the Key Distribution Center FIG. 3 depicts, by way of example only, the process of obtaining client-authenticating information from KDC 400 over a non-secure TCP/IP network 350, such as the Internet, that may later be used to establish that network server 300 is acting on behalf of the Kerberos user principal. Other publicly available secure authentication protocols may be used. The security of the system, however, may be enhanced further by implementing an authentication protocol that incorporates the use of timestamps. Timestamps can be used to restrict replay attacks, or the recording of some portion of an authentication protocol sequence and use of old messages at a later date to compromise the authentication protocol.

One example of a publicly available authentication protocol using timestamps is Kerberos Version 5 developed by Project Athena at MIT. The preferred embodiment as described below assumes the use of Kerberos Version 5. The details of this authentication procedure follow.

Once web server 305 receives encrypted login information from web browser 205 as indicated by arrow 356, network server 300 passes the Kerberos user principal name of client 200 and a request for a permission indicator to KDC 400 over non-secure network 350 as indicated by arrow 352. Upon receiving the request for a permission indicator, the KDC 400 generates a KDC session key for protecting transactions between network server 300 and KDC 400.

Using client 200's Kerberos user principal name, the KDC 400 extracts client 200's secret key from key database 405, which stores secret keys used by KDC 400 and other properly registered clients. Using client 200's secret key, the KDC 400 then encrypts one copy of the KDC session key and creates a permission indicator, which would typically include by way of example only, a timestamp, client 200's user name and network address, and another copy of the KDC session key. This permission indicator may be used later by client 200 to authenticate itself to KDC 400. The permission indicator is encrypted with KDC 400's private key, which is known only to KDC 400. KDC 400, therefore, can later decrypt the permission indicator to verify its authenticity.

KDC 400 then sends both the encrypted session key and the permission indicator back to the network server 300, as indicated at arrow 354. Network server 300 receives the encrypted information from KDC 400, and decrypts the KDC session key using client 200's user key. In one embodiment, the client user key is a one-way hash of client 200's password and other information, so the network server 300 may derive the user key by hashing client 200's password. Both the permission indicator and the KDC session key are stored in credentials cache 320.

Web server 305 encodes the contents of the credentials cache 320 and, as indicated at arrow 357, sends the contents of the credentials cache 320 to web browser 205. The authenticating information that may have resided in the network server 300 is then erased or otherwise deleted. Thereafter, in order for client 200 to continue with the transaction, client 200 will have to refresh the memory of network server 300. If a hacker or interloper managed to gain access to network server 300 while information was stored in credentials cache 320, only the permission indicator and session key could be obtained, because the Kerberos password is destroyed after being used. This information would be of limited value, however, because the permission indicator, in the preferred embodiment, would contain a date/time stamp and would become worthless after a specified period of time, usually relatively short, has elapsed.

3. Sending a Command to a Destination Server

After encoding credentials cache information from cache 320, client 200 can send this cache information along with a message, such as one or more commands ultimately intended for one or more destination servers 500, to the network server 300 as indicated at arrow 358. Network server 300 decodes the encoded credentials cache information and stores the permission indicator and KDC session key in a credentials cache 330. Although this credentials cache 330 is not the same as credentials cache 320, which is described above, the data therein is the same. In actuality, the information could be stored in the same location on the same physical storage device, although as a practical matter this may be highly unlikely.

As indicated at arrow 360, network server 300 now sends the permission indicator encrypted by the session key to KDC 400, along with authenticator(s) and request(s) to access destination server(s) 500. This authenticator(s) contain the Kerberos user principal name and a time stamp, encrypted using the KDC session key. KDC 400 decrypts the permission indicator using the KDC secret key to obtain the KDC session key and a validity period. If the KDC 400 successfully decrypts the KDC session key and validity period, the KDC 400 is assured that the permission indicator is the same one that it issued earlier.

The KDC 400 then uses the KDC session key to decrypt the authenticator(s) to obtain the Kerberos user principal name and a time stamp. If the time stamp is within the validity period, the KDC 400 generates access indicator(s). The access indicator(s) typically would include the Kerberos user principal name, a validity period, and a server session key for use between network server 300 and destination server(s) 500, all of which has been encrypted with the private key of the destination server(s) 500. KDC 400 then sends to network server 300 the encrypted access indicator(s), and copy(ies) of the server session key(s) encrypted using the KDC session key, as indicated at arrow 362.

Thereafter, network server 300 decrypts the copy(ies) of the server session key(s) that are encrypted using the KDC session key. Network server 300 then encrypts the message(s) or command(s), using the server session key(s) and, as indicated at arrow 364, sends the encrypted message(s) along with the access indicator(s) and new authenticator(s) to destination server(s) 500 via non-secure network 450. Destination server(s) 500 may use its own private key to decrypt and obtain the server session key(s).

By using the server session key(s), known only to destination server(s) 500 and the network server 300, the authenticity of the identity of client 200 can be validated at destination server(s) 500. The destination server(s) 500 can then trust the integrity of the message, such as a command, from client 200, thereby permitting access to server 500 if validation is correct. Destination server(s) 500 can compare the identity of client 200 to a list of access control criteria (ACL) that can be stored in ACL file 505 in destination server(s) 500.

B. Exemplary Processing

Figure 4:
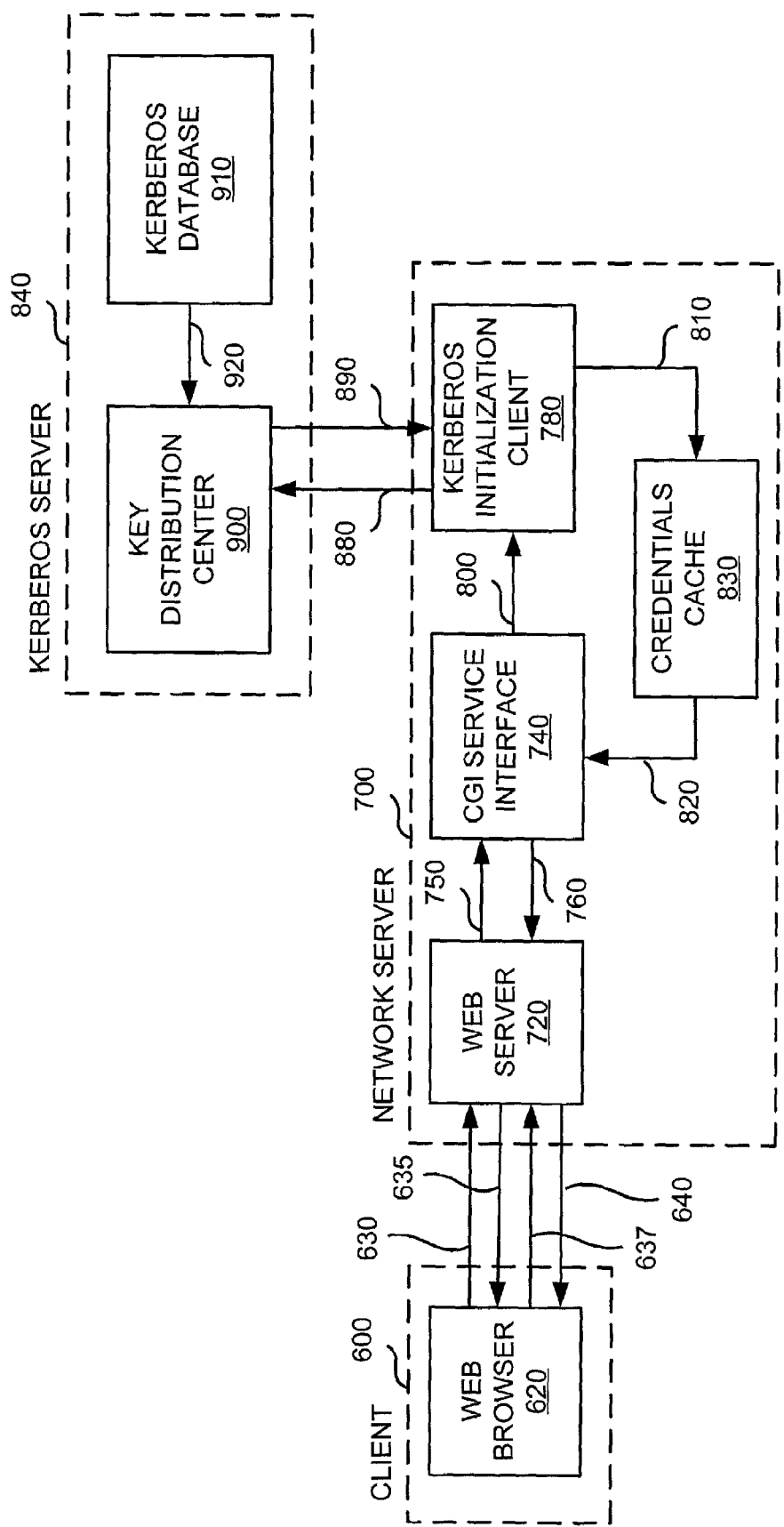
FIG. 4 is a block diagram of another system that may be used to implement the present invention.

A more detailed embodiment of the present invention, in particular an embodiment using a Kerberos authentication process, is depicted in FIGS. 4 through 9E. FIG. 4, in conjunction with the flowchart of FIGS. 5A-5B, describes the details of a login process. Once login has been properly achieved, FIGS. 6A and 6B, in conjunction with FIGS. 7A–7E, describe the details of how a command is issued from one or more clients to one or more destination servers acting as one or more managed hosts. The flow chart of FIG. 8 describes exemplary processing of a parallel execution utility according to an implementation consistent with the present invention. The flow chart of FIGS. 9A–9E describes exemplary processing of an alarm event handler in accordance with an implementation consistent with the present invention.

1. The Login Procedure

With reference now to FIG. 4, client 600 includes web browser 620. The single client 600 represents one or more clients that include one or more web browsers 620. Web browser 620 communicates with network server 700.

As will be further described below, arrows 630, 635, 637, and 640 indicate the exchange of information between web browser 620 and web server 720 of network server 700. Web server 720 exchanges information with a first CGI Service Interface 740, as indicated by arrows 750 and 760. CGI Service Interface 740 can be a process initiated by web server 720. As indicated by arrows 800, 810, and 820, CGI Service Interface 740 in turn exchanges information with Kerberos Initialization Client 780, which can be a process initiated by CGI Service Interface 740. Network Server 700 further includes credentials cache 830, which receives information from Kerberos Initialization Client 780, as indicated by arrow 810, and sends information to CGI Service Interface 740, as indicated by arrow 820.

As shown by arrows 880 and 890, network server 700, and in particular the Kerberos Initialization Client 780, communicates with a Kerberos server 840. In this embodiment, Kerberos server 840 includes a Key Distribution Center (KDC) 900 that has access to Kerberos database 910, as indicated by arrow 920. Kerberos Server 840 can be a group of processes running on the same computer as the network server 700 or on a different computer.

Figure 5A:
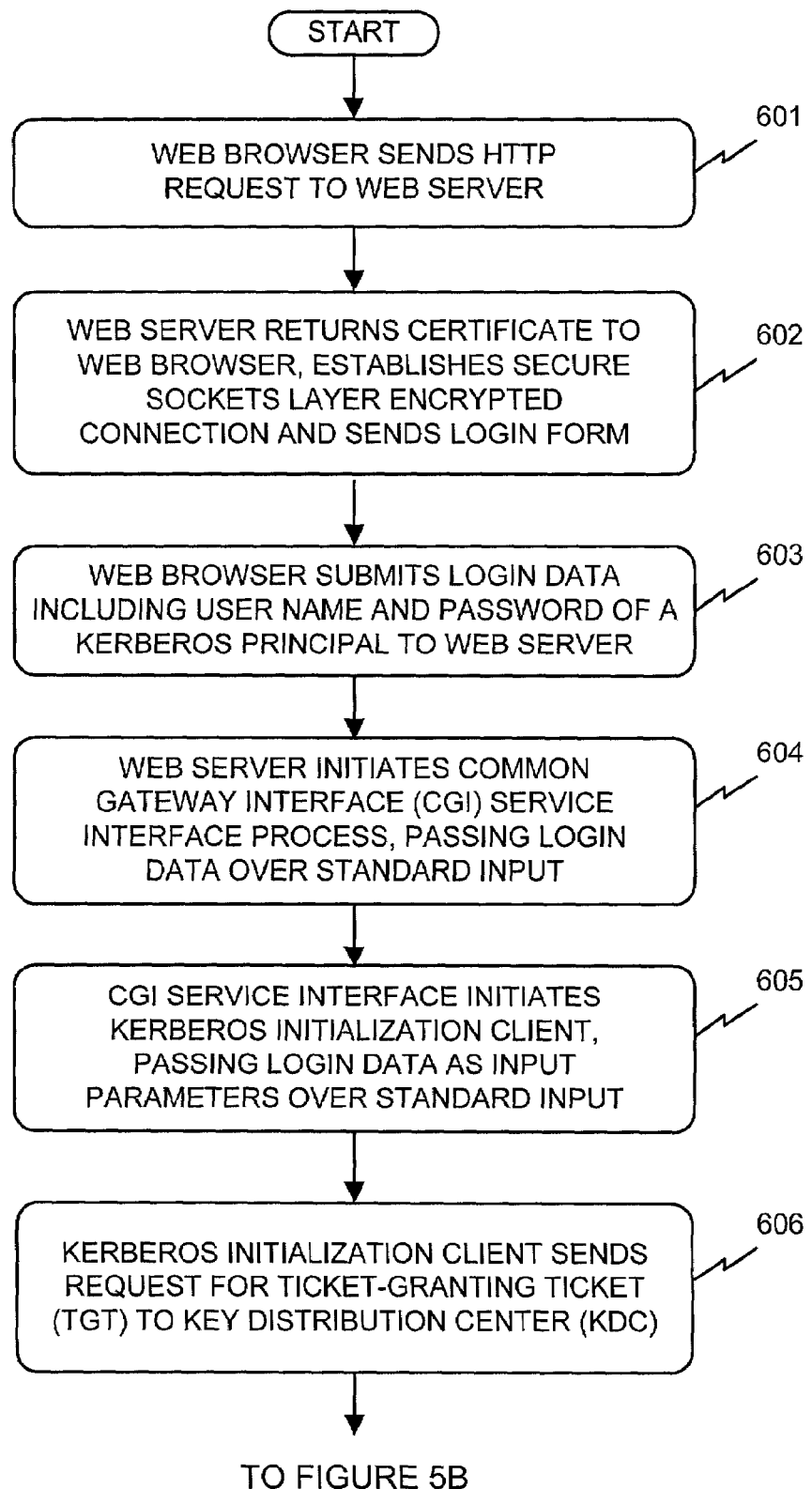
FIGS. 5A–5B are flow charts showing the operation of the system of FIG. 4 in accordance with the present invention.
Figure 5B:
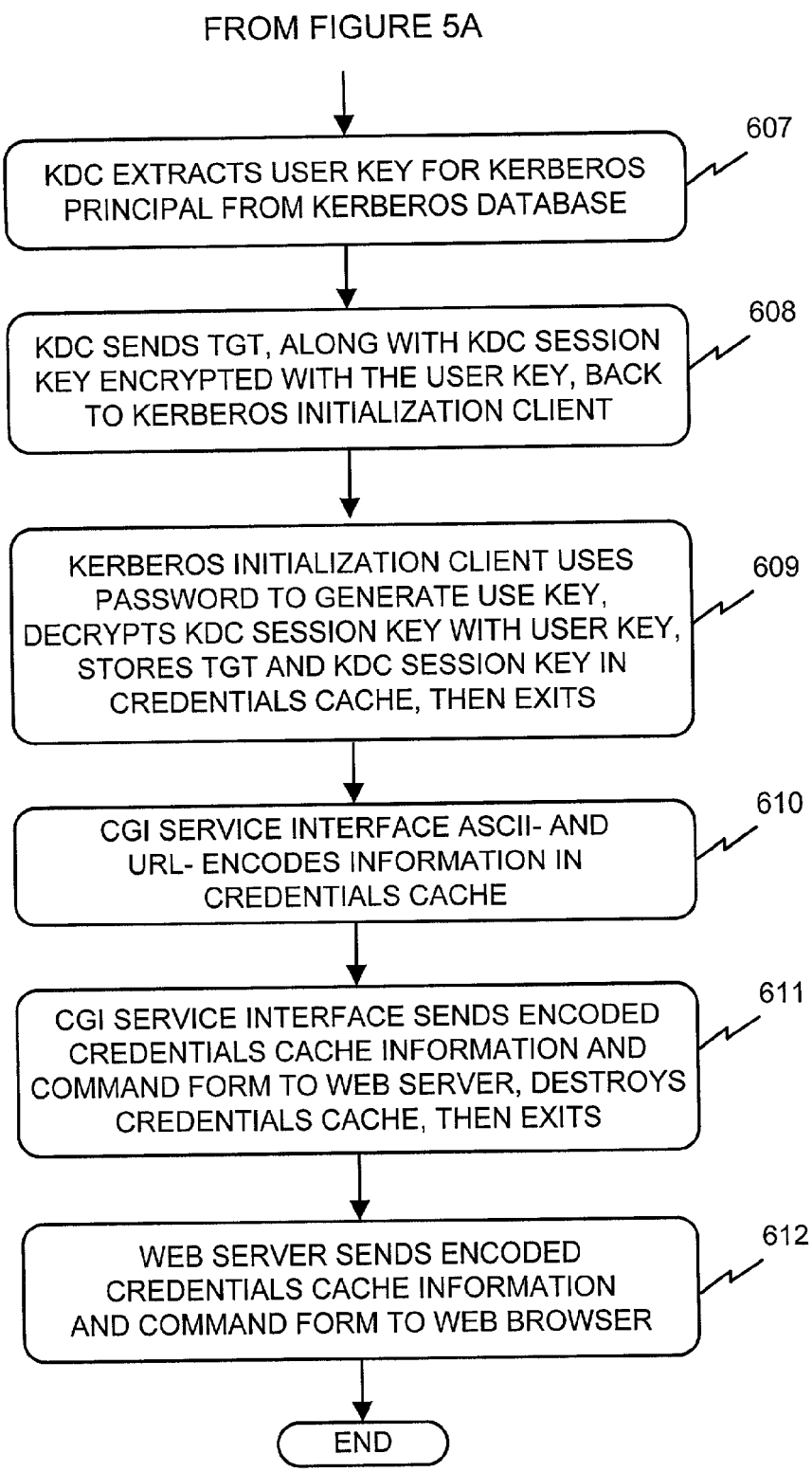

The flowchart of FIGS. 5A–5B further describes how the system of FIG. 4 accomplishes the login procedure. Web browser 620 sends an HTTP or S-HTTP request to web server 720, as indicated by arrow 630. [Box 601]. Web server 720 responds with a certificate to web browser 620. This certificate contains the network server's public key and a list of one or more cryptographic algorithms that the network server 700 supports and, by way of example only, may resemble an ITU X.509 standard certificate. Web server 720 may also establish an SSL encrypted connection with Web browser 620, and send a login form to browser 620, as indicated by arrow 635. [Box 602].

In response, web browser 620 submits login data back to web server 720 that may include, in this example, the user name and password of a Kerberos principal, as indicated by arrow 637. [Box 603].

Web server 720 executes CGI Service Interface 740. The login data is passed from web server 720 to CGI Service Interface 740 over a standard input, as indicated by arrow 750. [Box 604]. The CGI Service Interface 740 process may include a transient process that passes login information to the Kerberos Initialization Client 780. More specifically, the CGI Service Interface 740 executes the Kerberos Initialization Client 780. Login data is passed as input parameters over a standard input to the Kerberos Initialization Client 780 from CGI Service Interface 740, as indicated by arrow 800. [Box 605]. The Kerberos Initialization Client 780 sends a request for a ticket-granting ticket (TGT) to Key Distribution Center (KDC) 900 of Kerberos Server 840, as indicated by arrow 880. [Box 606].

In other words, the Kerberos Initialization Client 780 initiates a request to the KDC 900 for a permission indicator that includes, for example, the TGT. As already explained above, the permission indicator contains information that may be used during future transactions with KDC 900 for proper authentication.

KDC 900 extracts the user key for the Kerberos principal from Kerberos database 910, as indicated by arrow 920. [Box 607]. In the Kerberos application, client 600's secret key is preferably a secure one-way hash of client 600's password. Then, the KDC 900 sends the TGT, along with a KDC session key encrypted with the user key, back to the Kerberos Initialization Client, as indicated by arrow 890. [Box 608].

The Kerberos Initialization Client 780 uses client 600's password to generate the user key, decrypts the KDC session key with the user key, stores the TGT and KDC session key in credentials cache 830, as indicated by arrow 810, and then exits. [Box 609]. Credentials cache 830 is a data storage device used in the processing of the transaction that makes this data available to the CGI Service Interface 740.

CGI Service Interface 740 ASCII- and URL-encodes the information in credentials cache 830, as indicated by arrow 820. [Box 610]. The CGI Service Interface 740 then sends the encoded credentials cache information and a command form to web server 720, as indicated by arrow 760, destroys the credentials cache 830, then exits. [Box 611]. Web server 720 sends the encoded credentials cache information and the command form to web browser 620, as indicated by arrow 640. [Box 612].

In other words, once the Initialization Client 780 stores the information in the credentials cache 830, the Initialization Client 780 exits. Because the Initialization Client 780 embodies a transient process, all data that it contains would normally be erased. A permission indicator and KDC session key, however, are temporarily stored in the credentials cache 830. The CGI Interface 740 extracts the contents of the credentials cache 830 and ASCII- and URL-encodes the contents. The CGI Interface 740 is also a transient process, and it is, therefore, necessary to extract and pass the information to web server 720 before exiting.

The web server 720 encrypts the encoded credentials cache information and sends the data to the web browser 620, as well as a command form. Once the network server 700 sends the data to the client 600, all transient processes that handled the data exit and terminate and consequently, all authenticating information about client 600 is erased or removed. In order for client 600 to continue with the transaction, client 600 will have to refresh the memory of the server 720 and continue the second phase of the authentication process. Because there is no information relating to the transactions residing on the network server 700 during the time period in between transactions, if an unauthorized individual manages to improperly access the network server 700, as already explained above, any information obtained would be of limited value and the integrity of the system would be retained.

2. Issuing a Command

Once proper login has been accomplished as described with respect to FIGS. 4 and 5A–5B, one or more commands can be issued from client 600 to one or more managed hosts 1200, as will be described with regard to FIGS. 6A–6B and 7A–7E. Reference numbers in FIGS. 6A–6B and 7A–7E correspond to like structure and steps in FIGS. 4 and 5A–5B.

Figure 6A:
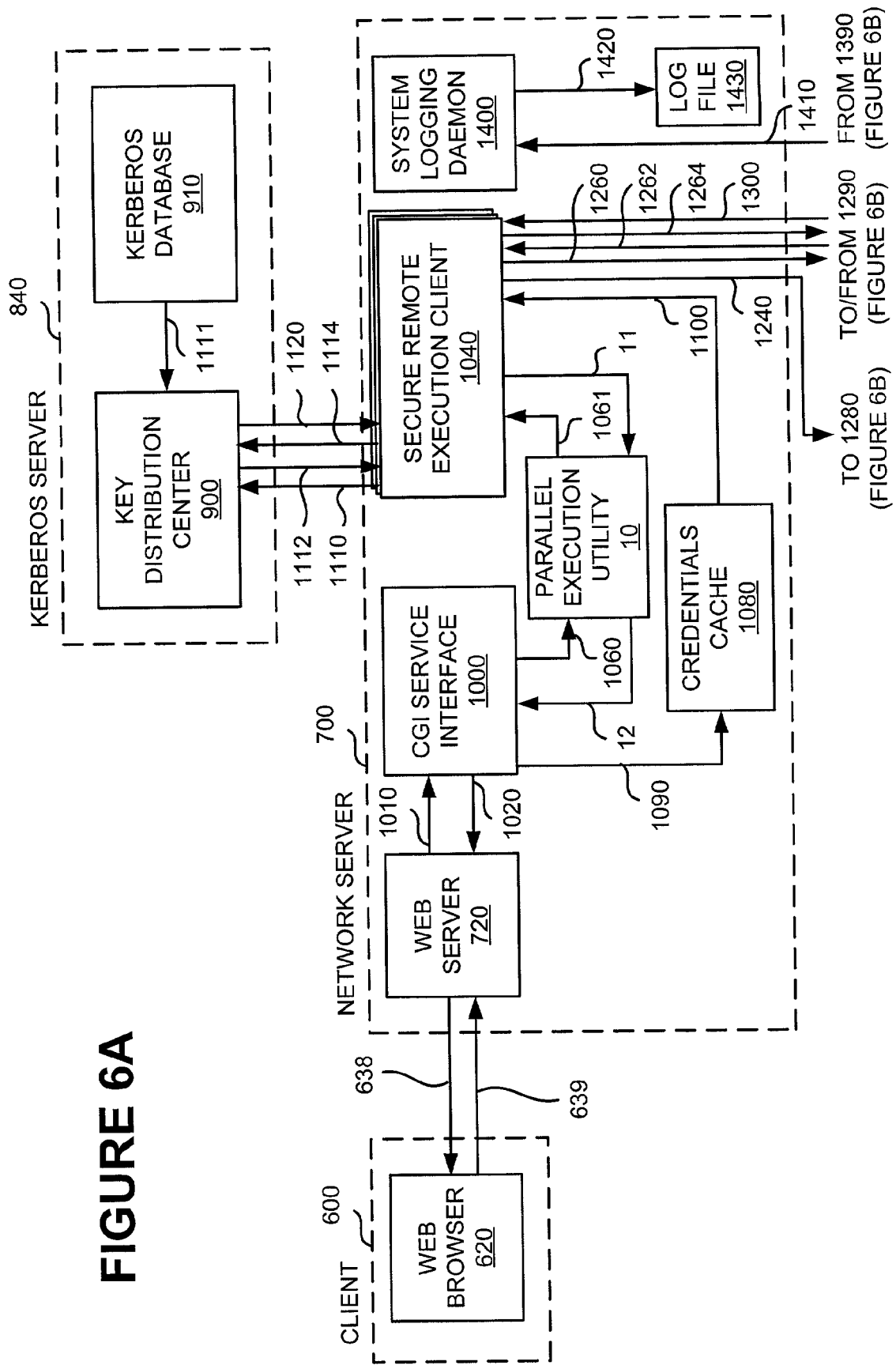
FIGS. 6A–6B are block diagrams showing additional aspects of the system of FIG. 4.

With reference now to FIG. 6A, web browser 620 of client 600 communicates with web server 720 of network server 700, as indicated by arrows 638 and 639. Web server 720 exchanges data with CGI Service Interface 1000, as indicated by arrows 1010 and 1020. CGI interface 1000 passes command data to one or more Secure Remote Execution (SRE) Clients 1040 via a Parallel Execution Utility 10, as indicated by arrows 1060 and 1061. The SRE Client 1040 may include a process initiated by the Parallel Execution Utility 10. The Parallel Execution Utility 10 may be a process initiated by CGI Service Interface 1000. The Parallel Execution Utility 10 may facilitate the issuance of commands and/or data to one or more managed hosts 1200 (FIG. 6B) via one or more SRE Clients 1040.

CGI Service Interface 1000 also passes data to credentials cache 1080, as indicated at arrow 1090, and credentials cache 1080 in turn passes data including the TGT to the SRE Client(s) 1040 as shown by arrow 1100. SRE Client(s) 1040 communicate with the KDC 900 of Kerberos Server 840, as indicated by arrows 1110 and 1120.

The SRE Client(s) 1040 can also send data to one or more Managed Hosts 1200 (FIG. 6B), as shown by arrows 1240, 1260 and 1264. More specifically, the SRE Client(s) 1040 send data to Internet Super-Daemon(s) 1280, as shown by arrow 1240, and also to the Secure Remote Execution Daemon(s) 1290, as shown by arrows 1260 and 1264. Internet Super-Daemon(s) 1280 may include persistent daemon process(es). Secure Remote Execution Daemon(s) 1290 may include process(es) initiated by Internet Super-Daemon(s) 1280, as shown by arrow 1281. Secure Remote Execution Daemon(s) 1290 also communicate with SRE Client(s) 1040, as shown by arrows 1262 and 1300.

Secure Remote Execution Daemon(s) 1290 have access to key table(s) 1310, as shown by arrow 1320, and also have access to ACL file(s) 1330, as indicated by arrow 1340. Key table(s) 1310 are preferably file(s) readable only by the root user on the Managed Host(s) 1200. The Secure Remote Execution Daemon(s) 1290 further exchange information with the Service Process(es) 1350, which may include process(es) initiated by the Secure Remote Execution Daemon(s) 1290, as indicated by arrows 1360 and 1370. Secure Remote Execution Daemon(s) 1290, as indicated by arrow 1380, can send data to System Logging Daemon(s) 1390, which are persistent daemon process(es). System Logging Daemon(s) 1390 further communicate with System Logging Daemon 1400 of Server 700, as indicated by arrow 1410. System Logging Daemon 1400, which may be a persistent daemon process, has access to log file 1430, as indicated by arrow 1420, for purposes of making a non-volatile record of all secure remote execution activity.

Figure 6B:
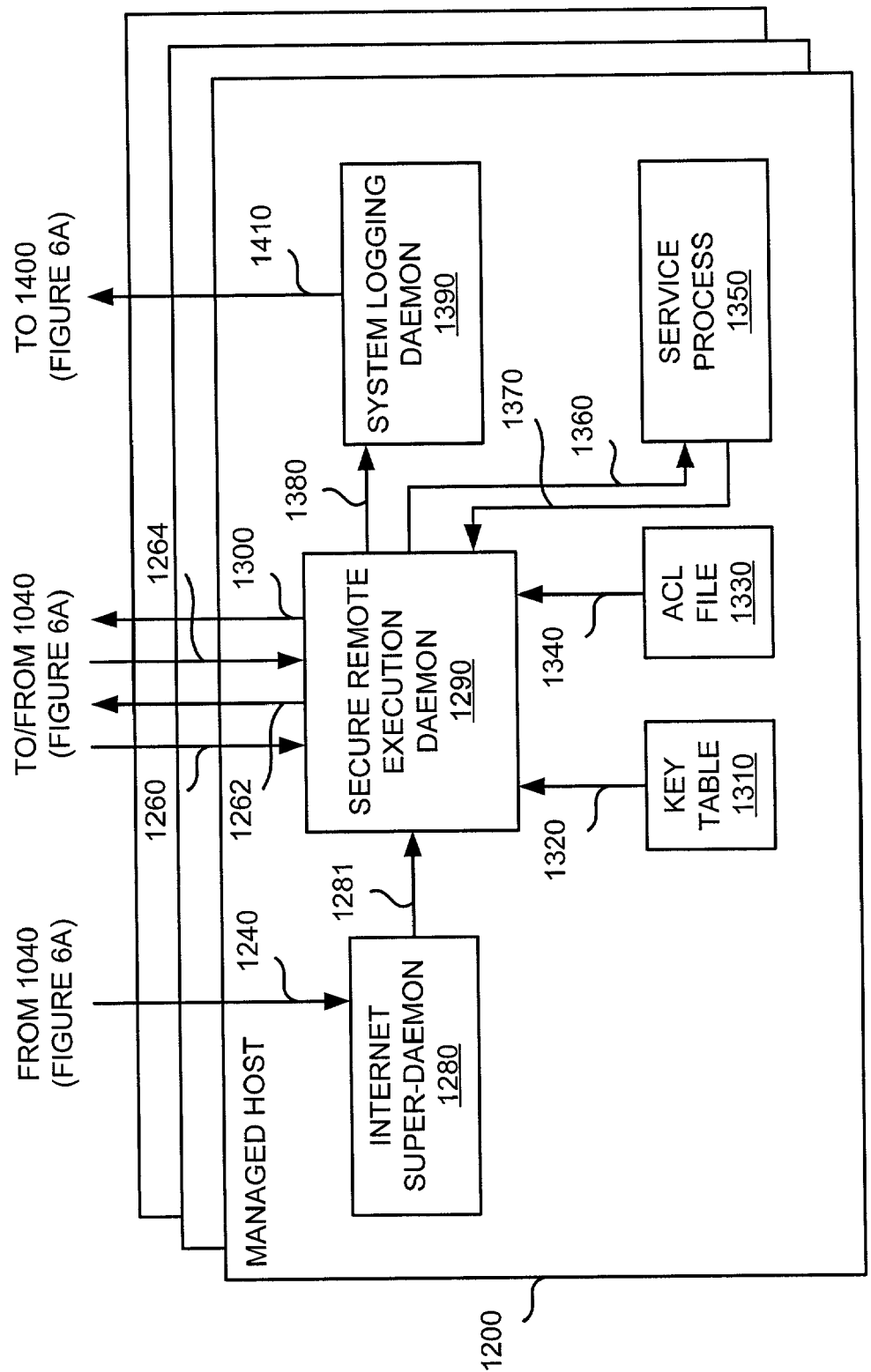

With reference now to the flow charts of FIGS. 7A–7E, the system of FIGS. 6A and 6B operates in the following manner. Web browser 620 submits command data and encoded credentials cache information to web server 720, as indicated by arrow 639. [Box 1501]. Web server 720 executes CGI Service Interface 1000, and passes the encoded credentials cache information and command data from web server 720 to CGI Interface 1000, as indicated by arrow 1010. [Box 1502].

CGI Service Interface 1000 decodes the encoded credentials cache information and restores it to a credentials cache 1080, as indicated by arrow 1090. [Box 1503]. CGI Service Interface 1000 initiates Parallel Execution Utility 10, and passes command data as input parameters to Parallel Execution Utility 10, as indicated by arrow 1060. [Box 1503]. Parallel Execution Utility 10 creates one or more SRE Clients 1040, passing command data as input parameters to the one or more of SRE Clients 1040 created, as indicated by arrow 1061. [Box 1504]. For purposes of clarity, the remainder of the description in this section will assume that only one SRE Client 1040 is created, though it should be clearly understood that more than one SRE Client 1040 may be created. SRE Client 1040 extracts the TGT and KDC session key from credentials cache 1080, as indicated by arrow 1100. [Box 1505].

Figure 7A:
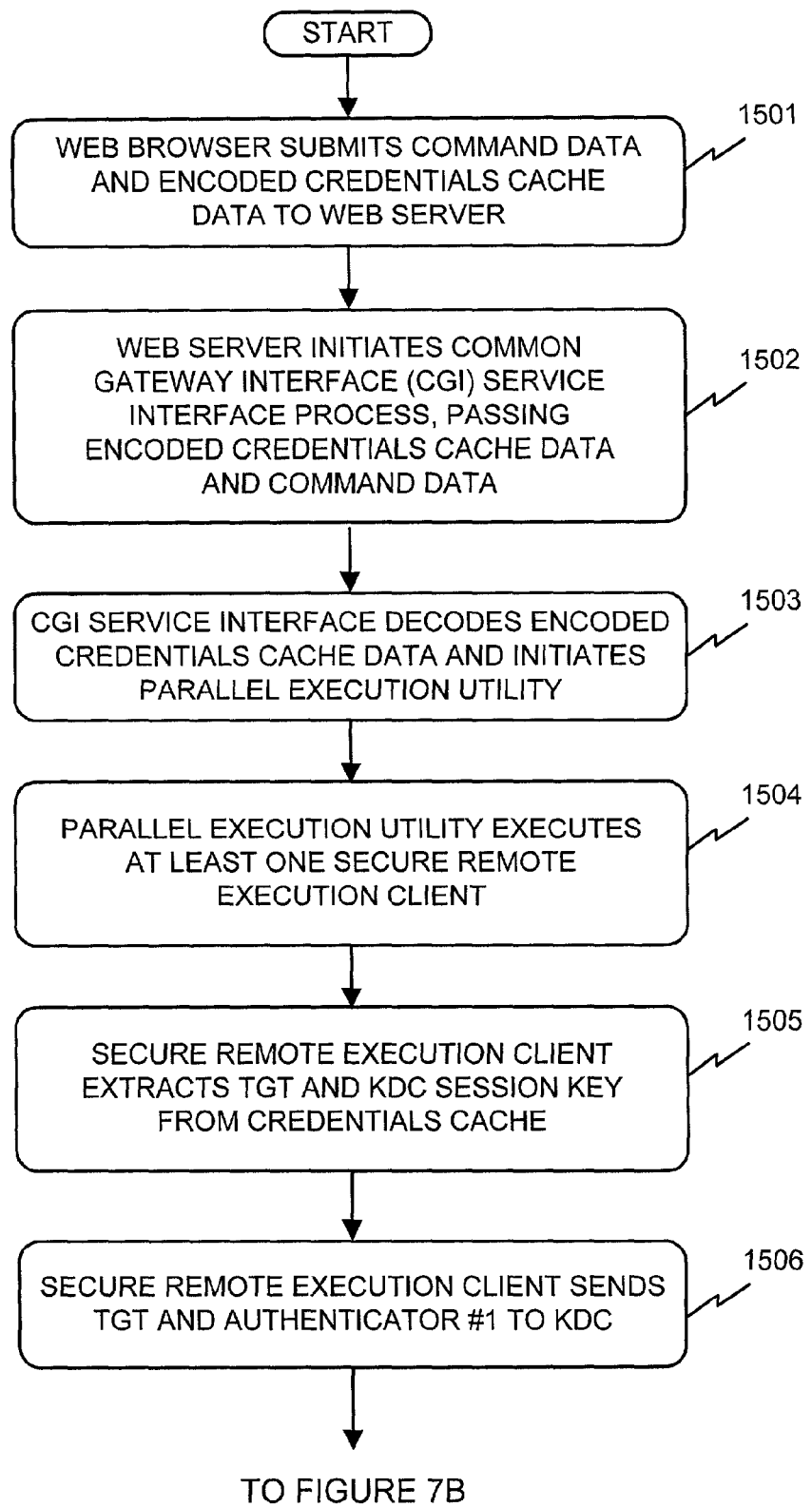
FIGS. 7A–7E are flow charts showing the operation of the system of FIGS. 6A and 6B in accordance with the present invention.
Figure 7B:
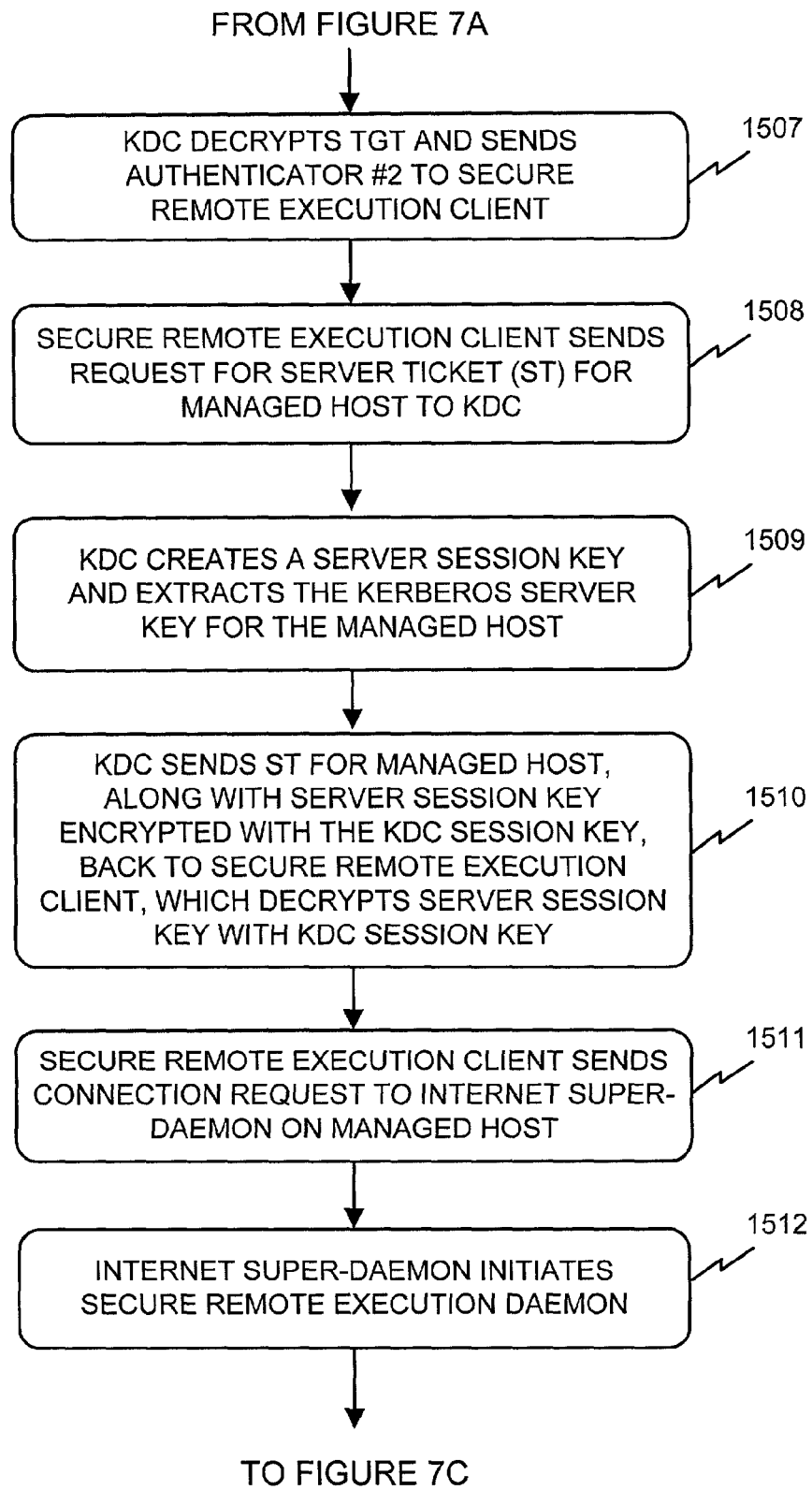

Then, the SRE Client 1040 sends the TGT and an authenticator #1 to KDC 900, as indicated by arrow 1110. [Box 1506]. The KDC 900 decrypts the TGT and sends authenticator #2 to SRE Client 1040, as indicated by arrow 1112. [Box 1507] (FIG. 7B). SRE Client 1040 then sends a request for a server ticket (ST) for Managed Host 1200 to KDC 900, as indicated by arrow 1114. [Box 1508]. KDC 900 creates a server session key and extracts the Kerberos server principal key for Managed Host 1200 from Kerberos database 910, as indicated by arrow 1111. [Box 1509]. KDC 900 creates a Kerberos ST for Managed Host 1200 and then sends the ST, along with the server session key encrypted with the KDC session key, back to SRE Client 1040, as indicated by arrow 1120, which decrypts the server session key with the KDC session key. [Box 1510]. Then, the SRE Client 1040 sends the connection request to Internet Super-Daemon 1280 of Managed Host 1200, as indicated by arrow 1240. [Box 1511].

Figure 7C:
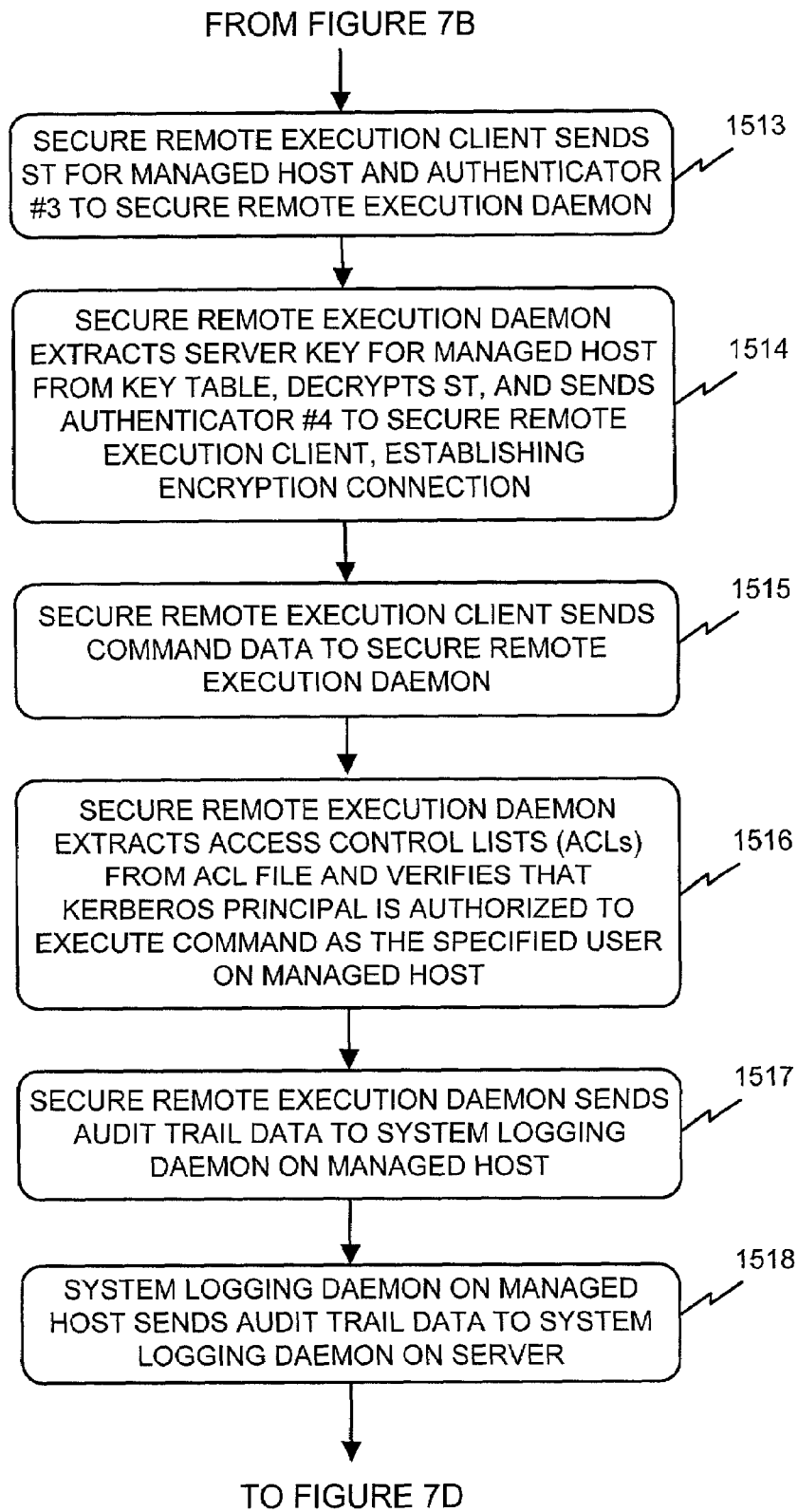

Internet Super-Daemon 1280 initiates the Secure Remote Execution Daemon 1290, passing command line parameters specifying encryption requirements, as indicated by arrow 1281. [Box 1512]. The SRE Client 1040 sends the ST for Managed Host 1200 and authenticator #3 to Secure Remote Execution Daemon 1290, as indicated by arrow 1260. [Box 1513] (FIG. 7C). The Secure Remote Execution Daemon 1290 extracts the server key for Managed Host 1200 from key table 1310, decrypts the server ticket and sends authenticator #4 to SRE Client 1040, establishing an encrypted connection, as indicated by arrow 1262. [Box 1514]. SRE Client 1040 then sends command data to Secure Remote Execution Daemon 1290, as indicated by arrow 1264. [Box 1515]. The Secure Remote Execution Daemon 1290 also extracts access-control lists (ACLs) from ACL file 1330, as indicated by arrow 1340, and verifies that the Kerberos principal is authorized to execute the command as the specified user on Managed Host 1200. [Box 1516].

Figure 7D:
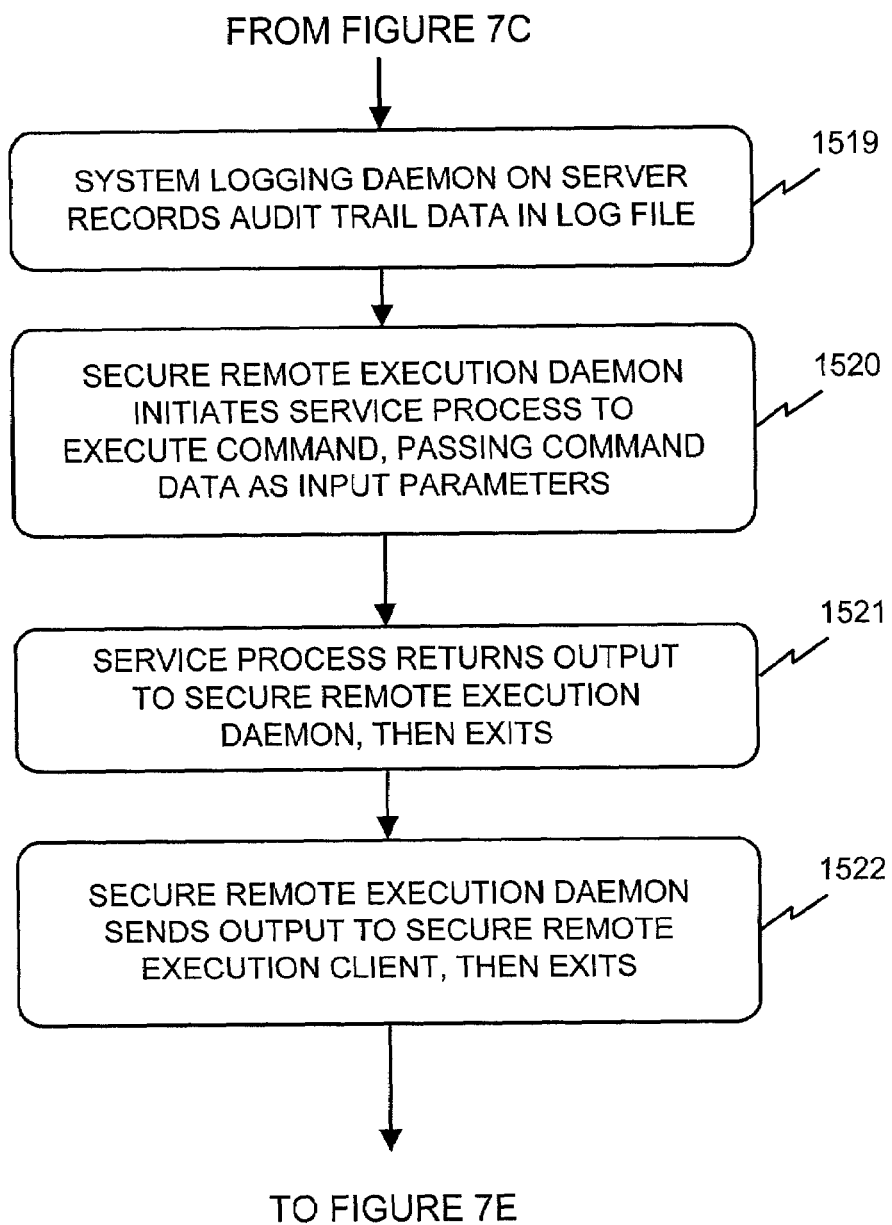

The Secure Remote Execution Daemon 1290 also sends audit trail data (such as, for example, the Kerberos principal name, remote user and host names, local user name, and command data) to System Logging Daemon 1390 on Managed Host 1200, as indicated by arrow 1380. [Box 1517]. This is to provide a record of all secure remote execution activity. In turn, the System Logging Daemon 1390 can send audit trail data to System Logging Daemon 1400 on Server 700, as indicated by arrow 1410. [Box 1518]. The System Logging Daemon 1400 records audit trail data in log file 1430, as indicated by arrow 1420. [Box 1519] (FIG. 7D).

The Secure Remote Execution Daemon 1290 executes Service Process 1350 to execute the command and passes command data as input parameters, as indicated by arrow 1360. [Box 1520]. The Service Process 1350, which may include a process initiated by Secure Remote Execution Daemon 1290, returns the output to Secure Remote Execution Daemon 1290, as indicated by arrow 1370, and then exits. [Box 1521]. The Secure Remote Execution Daemon 1290 sends output to SRE Client 1040, as indicated by arrow 1300, and then exits. [Box 1522].

Figure 7E:
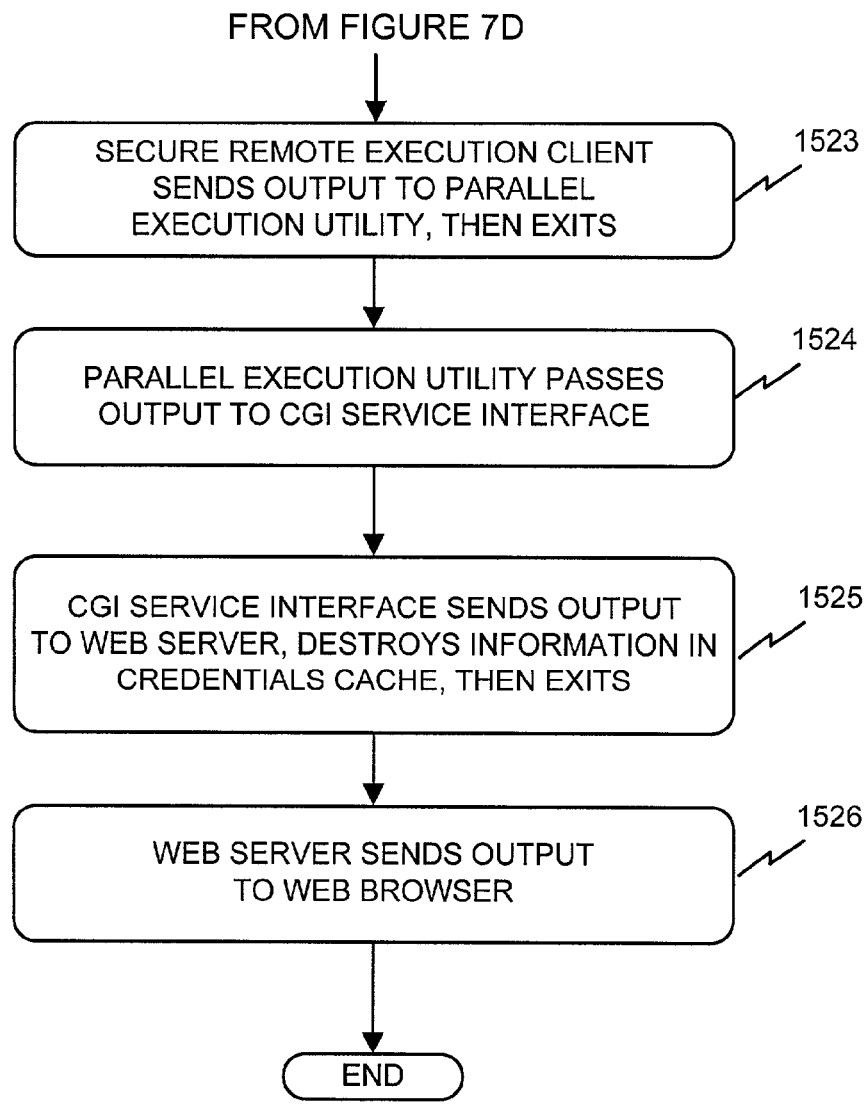

The SRE Client 1040 sends the output to Parallel Execution Utility 10, as indicated by arrow 11, and then exits. [Box 1523] (FIG. 7E). Parallel Execution Utility 10 passes this output to CGI Service Interface 1000, as indicated by arrow 12. [Box 1524] CGI Service Interface 1000 sends this output to web server 720, as indicated by arrow 1020. [Box 1525].

CGI Service Interface 1000 destroys credentials cache 1080 and, then exits. [Box 1525]. Web server 720 then sends the output to web browser 620, as indicated by arrow 638. [Box 1526]. This allows the user at the client system to see the results of the command that was executed by the Managed Host 1200.

It should be understood that more than one server and client can be used, and that this invention is equally applicable to multiple clients and multiple destination servers. Moreover, it should be understood that the processing of commands and/or data by multiple destination servers may be performed in a parallel, serial, or a combination of parallel and serial manner. Parallel Execution Utility 10 facilitates the parallel processing, as explained in more detail below.

3. Parallel Execution

Figure 8:
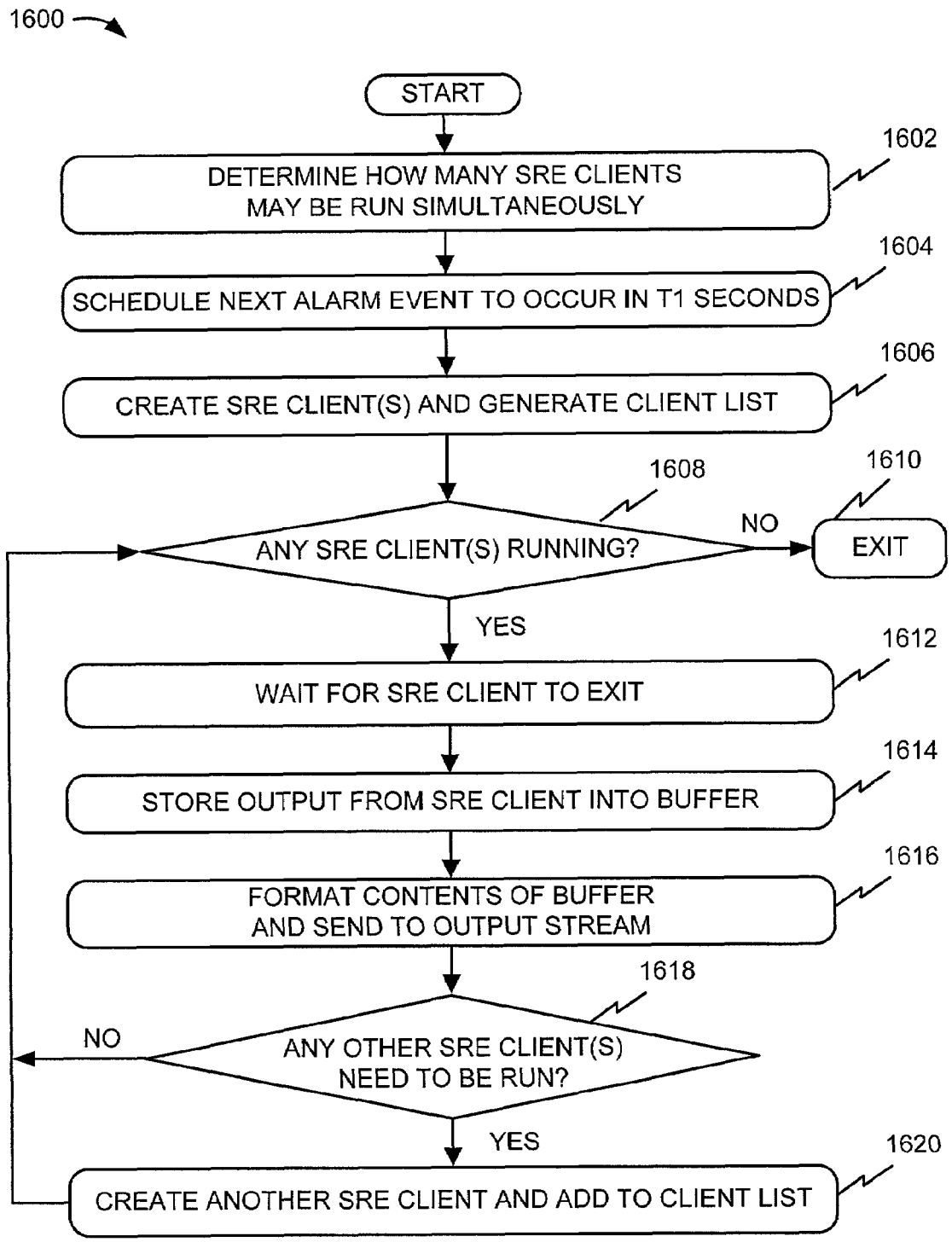
FIG. 8 is a flow chart of exemplary processing of a parallel execution utility according to an implementation consistent with the present invention.

Referring to FIG. 8, there is shown a flow diagram of an exemplary embodiment of a Parallel Execution Utility 10 in accordance with an aspect of the present invention. After receiving command data as input parameters, as described with respect to FIGS. 6A and 7A, variables are initialized using at least a portion of the command data received.

The Parallel Execution Utility 10 determines a threshold for the maximum number of SRE Clients 1040 that may be run concurrently. [Box 1602]. This maximum, for example, may be a global or system limitation or an account limitation.

The Parallel Execution Utility 10 may then schedule an initial alarm event to occur in T1 seconds. [Box 1604]. For the exemplary embodiment described herein, T1, T2 and T3 are 16, 32 and 2 seconds, respectively. However, other times may be used. In the exemplary embodiment described herein, alarms are not associated with individual SRE Clients 1040, but are applied on a global basis, as described in more detail below.

The Parallel Execution Utility 10 creates a number of SRE Clients 1040, subject to a maximum, and generates a list of created clients. [Box 1606]. SRE Clients 1040 may be created with at least a portion of their input parameters obtained from the command data received. Moreover, SRE Clients 1040 may be executed with all input parameters in place, so no additional passing of parameters may be needed after creation. The client list may be used to identify the SRE Clients 1040 that are currently running and the SRE Clients 1040 that have terminated or possibly encountered an error condition.

The Parallel Execution Utility 10 determines whether any SRE Client(s) 1040 are running. [Box 1608]. If no client is running, Parallel Execution Utility 10 exits. [Box 1610]. If at least one client is running, the Parallel Execution Utility 10 waits for a SRE Client 1040 to exit. [Box 1612]. As described above, a SRE Client 1040 may exit when its associated Managed Host 1200 completes its processing of one or more commands and/or data or for other reasons. After a SRE Client 1040 exits, the Parallel Execution Utility 10 stores its output, if any, in a storage element, such as a buffer, memory, register, or the like. [Box 1614].

When multiple SRE Clients 1040 are running, the Parallel Execution Utility 10 may have previously collected some of the output from one or more of the SRE Clients 1040 and stored the output in the storage elements. Thereafter, the Parallel Execution Utility 10 may format the contents, if any, of the storage element and send the formatted contents to an output stream, such as indicated by arrow 12 in FIG. 6A. [Box 1616]. For example, the Parallel Execution Utility 10 may group the outputs associated with each one of the SRE Clients 1040 and serialize the outputs for subsequent presentation to another system or process, such as web server 720 or web browser 620.

The Parallel Execution Utility 10 then determines whether another SRE Client 1040 needs to be run. [Box 1618]. If so, the Parallel Execution Utility 10 creates the SRE Client 1040 and adds it to the list of clients. [Box 1620]. The Parallel Execution Utility 10 then returns to box 1608 to determine whether any SRE Client(s) 1040 are running.

As mentioned above, Parallel Execution Utility 10 responds to alarms events. Alarm events occur when a timer expires. Referring to FIGS. 9A–9E, there is shown a flow diagram of exemplary processing 1700 of an Alarm Event Handler in accordance with an aspect of the present invention. In this implementation consistent with the present invention, the Alarm Event Handler may be part of the process executing the Parallel Execution Utility 10.

Figure 9A:
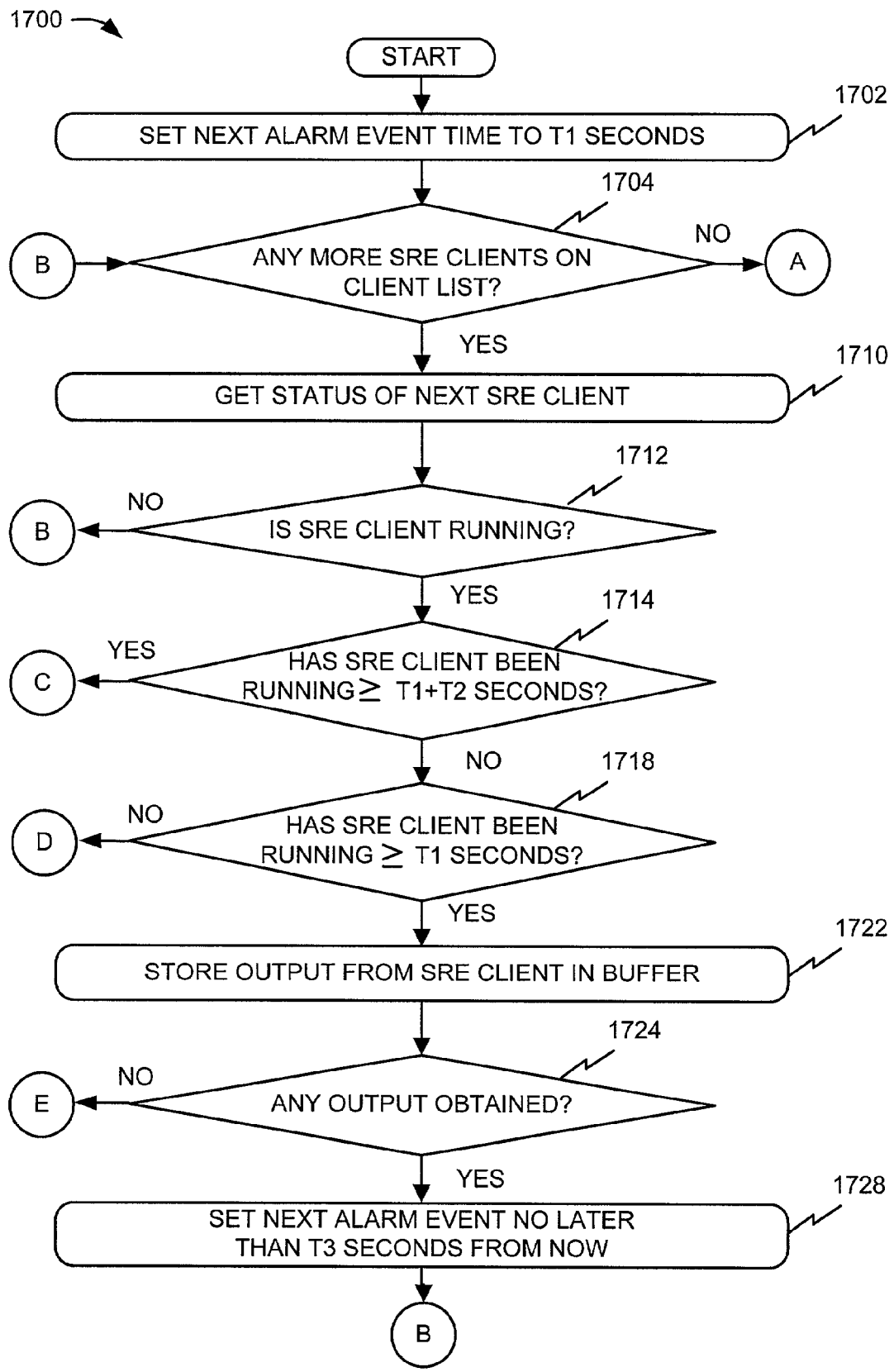

When the alarm event occurs, the Alarm Event Handler may initially set the next alarm event time to T1 seconds. [Box 1702] (FIG. 9A). The Alarm Event Handler may then determine whether there are any more SRE Clients 1040 on the client list to check. [Box 1704]. If there are none, the Alarm Event Handler schedules the next alarm event. [Box 1706] (FIG. 9B). The Alarm Event Handler schedules the next alarm event to check the client list again at a later time. After scheduling the next alarm event, the Alarm Event Handler exits. [Box 1708].

If there are more unchecked SRE Client(s) 1040 on the client list, then the Alarm Event Handler determines the status of a SRE Client 1040 on the list by, for example, examining data stored as part of the list. [Box 1710] (FIG. 9A). From the status data, the Alarm Event Handler determines whether the SRE Client 1040 is running. [Box 1712]. If it is not running, then it has exited. In this case, the Alarm Event Handler returns to box 1704 to determine whether any other unchecked SRE Client(s) 1040 are on the client list.

If the SRE Client 1040 is running, then the Alarm Event Handler determines whether this SRE Client 1040 has been running for a period of time equal to or exceeding a first allocated amount of time, which in this exemplary embodiment is T1+T2 seconds. [Box 1714]. If this SRE Client 1040 has been running for a period of time equal to or longer than the first allocated amount, then the Alarm Event Handler terminates the SRE Client 1040. [Box 1716] (FIG. 9C). The Alarm Event Handler may then return to box 1704 to determine whether another unchecked SRE Client 1040 is on the client list.

If this SRE Client 1040 has not been running for a period of time equal to or longer than the first allocated amount, then the Alarm Event Handler determines whether the SRE Client 1040 has been running for a period of time equal to or longer than a second allocated amount of time, which is less than the first allocated amount of time. In this exemplary embodiment, the second allocated amount of time may be T1 seconds.

If the SRE Client 1040 has not been running for a period of time equal to or longer than T1, the Alarm Event Handler calculates a next alarm event time, which in this exemplary embodiment is no longer than T1 seconds from the start time of the SRE Client 1040. [Box 1720] (FIG. 9D). The Alarm Event Handler may then return to box 1704 to determine whether another unchecked SRE Client 1040 is on the client list.

If this SRE Client 1040 has been running for a period of time equal to or longer than T1 seconds but less than T1+T2 seconds, then the Alarm Event Handler stores the output from the SRE Client 1040, if any, in a storage element, such as a buffer, memory, register, or a similar storage device. [Box 1722] (FIG. 9A). The Alarm Event Handler may then determine whether any new output from this SRE Client 1040 was obtained. [Box 1724].

If no output was obtained from the SRE Client 1040, then the Alarm Event Handler terminates the SRE Client 1040. [Box 1726] (FIG. 9E). The Alarm Event Handler may then return to box 1704 to determine whether another unchecked SRE Client 1040 is on the client list. If some output was obtained from the SRE Client 1040, however, then the Alarm Event Handler calculates a next alarm event time. [Box 1728] (FIG. 9A). In this exemplary embodiment, the next alarm event time is calculated to be no more than T3 seconds from the current time. The Alarm Event Handler may then return to box 1704 to determine whether another unchecked SRE Client 1040 is on the client list and processing continues as described above.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for providing secure communication of commands from a client to a plurality of hosts via a network server, comprising:
    utilizing authentication information and credentials cache information within the network server to facilitate the secure communication, wherein the authentication information is erased and the credentials cache information is destroyed after the utilizing;
    receiving at least one command from the client;
    initiating one or more remote execution processes for processing the at least one command;
    transmitting the at least one command to one or more of the hosts via the one or more remote execution processes;
    obtaining, from the one or more remote execution processes, data associated with the one or more hosts executing the at least one command;
    formatting the data; and
    sending the formatted data to the client.

2. The method of claim 1, further comprising:
    determining a maximum number of remote execution processes that may run simultaneously.

3. The method of claim 2, wherein the initiating includes:
    creating no more than the maximum number of remote execution processes to process the at least one command.

4. The method of claim 1, further comprising:
    determining whether any of the one or more remote execution processes is running.

5. The method of claim 4, wherein the obtaining data includes:
    waiting for one of the one or more remote execution processes to exit, and
    storing data from the one remote execution process.

6. The method of claim 1, wherein the formatting includes:
    grouping data from each of the one or more remote execution processes, and
    serializing the data.

7. The method of claim 1, further comprising:
    determining that another remote execution process needs to be initiated; and
    initiating the other remote execution process.

8. The method of claim 1, wherein the initiating includes:
    creating a list of the one or more remote execution processes that have been initiated.

9. The method of claim 8, further comprising:
    setting a time of an alarm event; and
    obtaining a status of the one or more remote execution processes on the list when the alarm event occurs.

10. The method of claim 9, wherein the obtaining a status includes:
    determining whether the next remote execution process has been running for a first amount of time, and
    terminating the next remote execution process when the next remote execution process has been running for at least the first amount of time.

11. The method of claim 10, wherein the obtaining a status further includes:
    determining whether the next remote execution process has been running for a second amount of time, the second amount of time being less than the first amount of time, and
    setting a next alarm event when the next remote execution process has been running the second amount of time.

12. The method of claim 11, wherein the obtaining data includes:
    storing data from the next remote execution process when the next remote execution process has been running less than the first amount of time but at least the second amount of time.

13. A system for providing secure communication of commands from a client to a plurality of hosts via a network server, comprising:
    means for utilizing authentication information and credentials cache information within the network server to facilitate the secure communication, wherein the authentication information is erased and the credentials cache information is destroyed after operation of the utilizing means;
    means far receiving a plurality of commands from the client;
    means for initiating one or more remote execution processes for processing the commands;
    means for transmitting the commands to one or more of the hosts via the one or more remote execution processes;
    means for obtaining data from the one or more remote execution processes in response to the one or more hosts executing the commands; and
    means for sending the data to the client.

14. A computer-readable that stores instructions executable by one or more processors for performing a method for providing secure communication of messages from a client to a plurality of hosts via a network server, comprising:
    instructions for utilizing authentication information and credentials cache information within the network server to facilitate the secure communication, wherein the authentication information is erased and the credentials cache information is destroyed after execution of the utilizing instructions;
    instructions for acquiring at least one message from the client;
    instructions for initiating one or more remote execution processes for processing the at least one message;
    instructions for transmitting the at least one message to one or more of the hosts via the one or more remote execution processes;
    instructions for obtaining, from the on or more remote execution processes, data associated with the one or more hosts processing the at least one message; and
    instructions for transmitting the data to the client.

15. The computer-readable medium of claim 14, further comprising:
    instructions for determining a maximum number of remote execution processes that may run simultaneously.

16. The computer-readable medium of claim 15, wherein the instructions for initiating include:
   instructions for creating no more than the maximum number of remote execution processes to process the at least one message.

17. The computer-readable medium of claim 14, further comprising:
   instructions for determining whether any of the one more remote execution processes is running.

18. The computer-readable medium of claim 17, wherein the instructions for obtaining data include:
   instructions for waiting for one of the one or more remote execution processes to exit, and
   instructions for storing data from the one remote execution process.

19. The computer-readable medium of claim 14, further comprising:
   instructions for grouping data from each of the one or more remote execution processes; and
   instructions for serializing the data for transmission to the client.

20. The computer-readable medium of claim 14, further comprising:
   instructions for determining that another remote execution process needs to be initiated; and
   instructions for initiating the other remote execution process.

21. The computer-readable medium of claim 14, wherein the instructions for initiating include:
   instructions for creating a list of the one or more remote execution processes that have been initiated.

22. The computer-readable medium 21, further comprising:
   instructions for setting a time of an alarm event; and
   instructions for obtaining a status of the one or more remote execution processes on the list when the alarm event occurs.

23. The computer-readable medium of claim 22, wherein the instructions for obtaining a status include:
   instructions for determining whether the next remote execution process has been running for a first amount of time, and
   instructions for terminating the next remote execution process when the next remote execution process has been running for at least the first amount of time.

24. The computer-readable medium of claim 23, wherein the instructions for obtaining a status further include:
   instructions for determining whether the next, remote execution process has been running for a second amount of time less than the first amount of time, and
   instructions for setting a next alarm event when the next remote execution process has been running no more than the second amount of time.

25. The computer-readable medium of claim 24, wherein the instructions for obtaining data include:
   instructions for storing data from the next remote execution process when the next remote execution process has been running less than the first amount of time but at least the second amount of time.

26. A network server which utilizes authentication information and credentials cache information in transactions to facilitate secure communication, the network server being in communication with one or more clients and a plurality of hosts, the network server comprising:
   means for erasing the authentication information and for destroying the credentials cache information after each one of the transactions whereby the authentication information and credentials cache information are not stored in the server in-between the transactions;
   a service interface configured to receive a plurality of messages from the clients and transmit data associated with the messages to the clients; and
   a parallel execution utility configured to initiate one or more of a plurality of remote execution processes to process the messages from the clients, transmit the messages to one or more of the hosts via the one or more remote execution processes, obtain, from the one or more remote execution processes, data associated with the one or more hosts processing the messages, and provide the data to the service interface.

27. The network server of claim 26, wherein the parallel execution utility is further configured to determine a maximum number of the remote execution processes that may run simultaneously.

28. The network server of claim 27, wherein the parallel execution utility is configured to create no more than the maximum number of remote execution processes to process the messages.

29. The network server of claim 26, wherein the parallel execution utility is configured to determine whether any of the one or more remote execution processes is running.

30. The network server of claim 29, wherein the parallel execution utility is configured to wait for one of the one or more remote execution processes to exit and gather data from the one remote execution process.

31. The network server of claim 26, wherein the parallel execution utility is configured to group data from each of the one or more remote execution processes and serialize the data for transmission to the clients.

32. The network server of claim 26, wherein the parallel execution utility is configured to determine that another one of the remote execution processes needs to be initiated and initiate the other remote execution process.

33. The network server of claim 26, wherein the parallel execution utility is configured to create a list of the one or more remote execution processes that have been initiated.

34. The network server of claim 33, wherein the parallel execution utility is configured to set a time of an alarm event and obtain a status of the one or more remote execution processes on the list when alarm event occurs.

35. The network server of claim 34, wherein the parallel execution utility is configured to determine whether the next remote execution process has been running for a first amount of time and terminate the next remote execution process when the next remote execution process has been running for at least the first amount of time.

36. The network server of claim 35, wherein the parallel execution utility is configured to determine whether the next remote execution process has been running for a second amount of time less than the first amount of time, and set a next alarm event when the next remote execution process has been running no more than the second amount of time.

37. The network server of claim 36, wherein the parallel execution utility is configured to gather data from the next remote execution process when the next remote execution process has been running less than the first amount of time but at least the second amount of time.

* * * * *